United States Patent

Subramanian et al.

(10) Patent No.: US 6,275,818 B1
(45) Date of Patent: Aug. 14, 2001

(54) COST BASED OPTIMIZATION OF DECISION SUPPORT QUERIES USING TRANSIENT VIEWS

(75) Inventors: Narayana Iyer Subramanian, San Jose; Shivakumar Venkataraman, Sunnyvale, both of CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/186,804

(22) Filed: Nov. 5, 1998

Related U.S. Application Data

(60) Provisional application No. 60/063,979, filed on Nov. 6, 1997.

(51) Int. Cl.[7] .................................................. G06F 7/00
(52) U.S. Cl. ........................................ 707/2; 707/3
(58) Field of Search .............................. 707/2–5

(56) References Cited

U.S. PATENT DOCUMENTS

| | | | | |
|---|---|---|---|---|
| 5,819,255 | * | 10/1998 | Celis et al. | 707/2 |
| 5,864,840 | * | 1/1999 | Leung et al. | 707/2 |
| 5,864,847 | * | 1/1999 | Goel et al. | 707/4 |
| 5,897,632 | * | 4/1999 | Dar et al. | 707/2 |
| 5,943,666 | * | 8/1999 | Kleewein et al. | 707/2 |
| 6,061,676 | * | 5/2000 | Srivastava et al. | 707/3 |
| 6,092,062 | * | 7/2000 | Lohman et al. | 707/2 |

* cited by examiner

Primary Examiner—John Breene
Assistant Examiner—Susan F. Rayyan
(74) Attorney, Agent, or Firm—Gates & Cooper LLP

(57) ABSTRACT

The present invention discloses a method, apparatus, and article of manufacture for optimizing one or more queries. Initially, redundancies in execution steps for the one or more queries are identified. Then, a new set of equivalent execution steps is created by eliminating redundancies in the execution steps. The new set of equivalent execution steps is used to execute the one or more queries when the use results in efficient query processing.

27 Claims, 9 Drawing Sheets

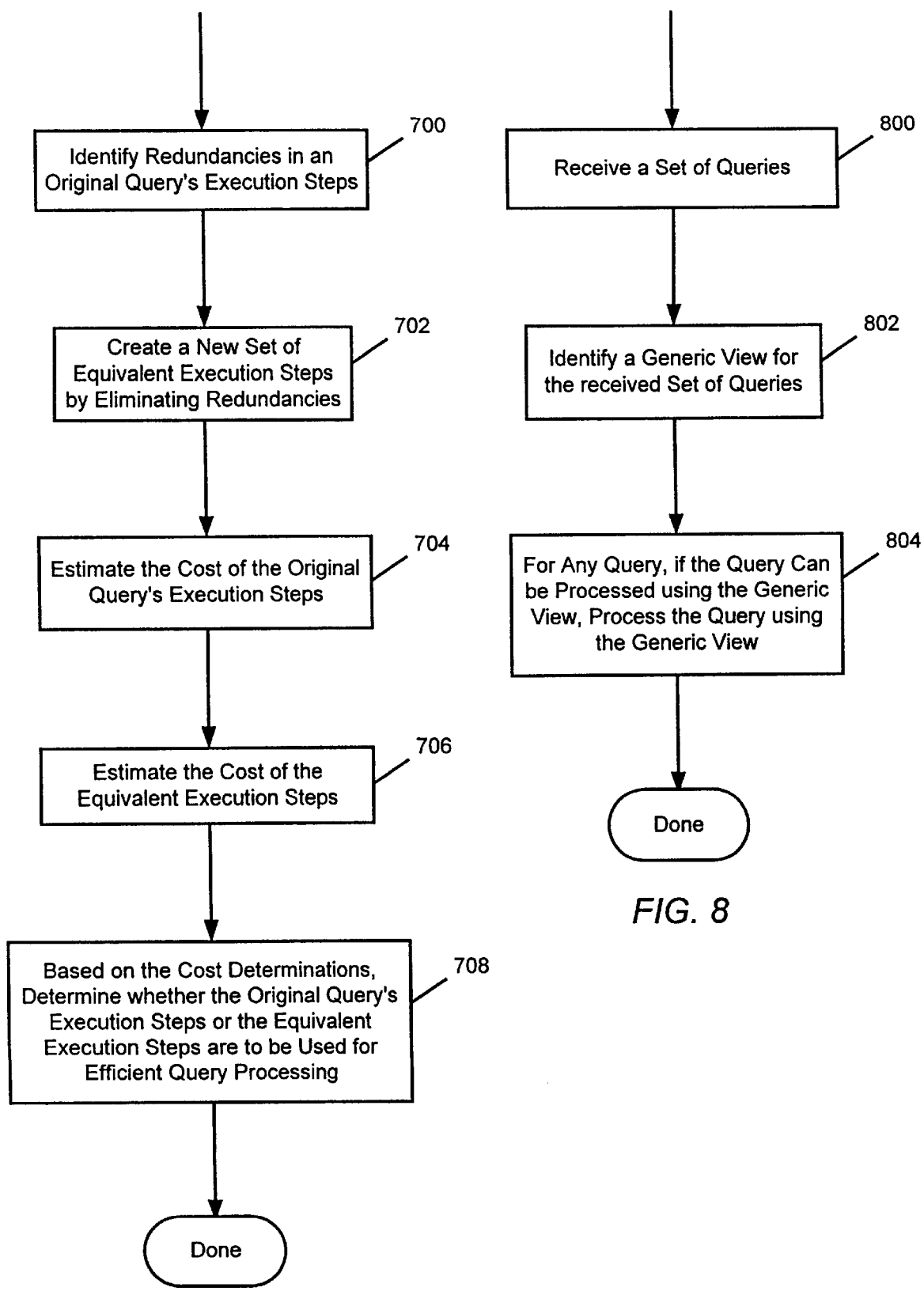

COST BASED OPTIMIZATION OF DECISION SUPPORT QUERIES USING TRANSIENT VIEWS

PROVISIONAL APPLICATION

This application claims the benefit of U.S. Provisional application Ser. No. 60/063,979, entitled "COST BASED OPTIMIZATION OF DECISION SUPPORT QUERIES USING TRANSIENT VIEWS," filed on Nov. 6, 1997, by Narayana I. Subramanian et al., which is incorporated by reference herein.

BACKGROUND OF THE INVENTION

1. Field of the Invention

This invention relates in general to computer-implemented database management systems, and, in particular, to cost-based optimization of queries by identifying and eliminating redundant execution steps in processing the queries and to identifying generic views for use in executing the queries.

2. Description of Related Art

Next generation decision support applications are typically capable of processing huge amounts of data, and they may have the ability to integrate data from multiple, heterogeneous data sources. Such data sources may include traditional database systems, repositories on the Internet/World Wide Web ("the Web"), semi-structured documents, and file systems. These data sources often differ in a variety of aspects, such as their data models, the query languages they support, and their network protocols. Additionally, they are frequently spread over a wide geographical area. Decision support queries may be used to analyze and compare information from diverse sources. Processing decision support queries in this setting often involves redundant processing because comparing information requires comparing the same data with different GROUP BY operations. A GROUP BY operation causes rows in an intermediate query answer set to be grouped according to the values in the column(s) specified in the GROUP BY operation. Exemplary redundancies may include repeated access of the same data source and multiple executions of similar processing sequences. Thus, the cost of processing decision support queries in this setting can be quite high.

This problem of efficiently processing heterogeneous decision support queries has recently received considerable attention from database researchers: Ahmed, R., Smedt, P., Du, W., Kent, W., Ketabchi, A., and Litwin, W, The Pegasus Heterogeneous Multidatabase System, *IEEE Computer*, December 1991, [hereinafter "[ASD+91]"]; Chawathe, S., Garcia-Molina, H., Hammer, H., Ireland, K., Papakonstantinou, Y., Ullman, J. D., and Widom, J.; The TSIMMIS Project: Integration of Heterogeneous Information Sources, In *Proc. of IPSJ*, Tokyo, Japan, 1994, [hereinafter "[CGH+94]"]; Christophides, V., Cluet, S. Abiteboul, S., and Scholl, M., From Structured Documents to Novel Query Facilities, In *ACM SIGMOD Intl. Conf on Management ofData*, 1994, [hereinafter "[CAS94]"]; Papakonstantinou, Yannis, Garcia-Molina, H., and Widom, Jennifer, Object Exchange Across Heterogeneous Information Sources, In *Proc. Intl. Conf on Data Engineering*, Taipei, Taiwan, February 1995, [hereinafter "[PGW95]"]; Subrahmanian, V. S., Adali, S., Brink, A., Emery, R., Lu, J. J., Raiput, A., Rogers, T. J., Ross, R., and Ward, C. Hermes, Heterogeneous Reasoning and Mediator System, Tech.report, submitted for publication, Institute for Advanced Computer Studies and Department of Computer Science University of Maryland, College Park, Md. 20742, 1995, [hereinafter "[SAB+95]"]; Levy, A. Y., Rajaraman, A., and Ordille, J. J., Querying Heterogeneous Informnation Sources Using Source Descriptions, In *Proc. 22nd VLDB Conf*, pages 251–262, 1996, [hereinafter "[LRO96]"]; Tomasic, A., Raschid, L., and Valduriez, P., Scaling Heterogeneous Databases and the Design of Disco, In Proc. IEEE Intl. Conf on Distributed Computing Systems, 1996, [hereinafter "[TRV96]"]; Lakshmanan, L.V.S., Sadri, F., and Subramanian, I. N. SchemaSQL—a language for querying and restructuring multidatabase systems, In *Proc. IEEE Int. Conf on Very Large Databases* (VLDB'96), pages 239–250, Bombay, India, September 1996, [hereinafter "[LSS96]"]; Atzeni, Paolo, Mecca, Giansalvatore, Merialdo, Paolo, and Tabet, Elena. Structures in the Web, Technical Report, DDS, Sezione Informatica, Universita di Roma Tre, 1996, [hereinafter "[ANIMT96]"]; L. M. Haas, D. Kossmann, E. L. Wimmers, and J. Yang, Optimizing Queries Across Diverse Data Sources, In *Proceeding of the VLDB Conference*, Aug. 1997, "[HKWY97]"]; and Abiteboul, Serge, Querying Semi-Structured Data, *In 6th International Conf on Database Theory*, Delphi, Greece, January 1997, [hereinafter "[Abi97]"], which are incorporated by reference herein.

The majority of the approaches are based on the idea of developing a database-like 'wrapper' for data sources and implementing queries against these sources [CGH+94], [HKWY97], and Tork R. M. and P. Schwarz, Dont Scrap It, Wrap It! A Wrapper Architecture for Legacy Data Sources, In *Proceeding of the VLDB Conference*, Aug. 1997, [hereinafter "[RS97]"], which are incorporated by reference herein. Typically, wrappers provide a relational or object-relational view of the data in the non-traditional sources and enable the user to use a common language/interface to query data from the diverse sources. Systems that provide end users with an integrated view of data in multiple data sources are referred to as Heterogeneous Database Systems (HDBS) and Multi-database Systems (MDBS) and are increasingly becoming relevant in the context of real-life business applications.

As an illustration, consider an application in which an investment broker manages the investment portfolios of his clients. The portfolio information may be stored in a relational database, which also contains other information about the clients such as their address, profession, etc. The broker obtains the latest stock price, as well as historical stock price information from the stock exchange servers on the Web. The broker also maintains account information in a spreadsheet for each client. In order to make complex decisions involving the buying and selling of stocks for the clients, the broker would have to use decision support queries to analyze and compare information from all of these sources.

Decision support queries analyze and compare information from diverse sources. Comparing information from diverse sources may require comparing the same data with different GROUP BY operations. Such a comparison may result in a query specification that contains computational redundancies. An analysis of TPCD benchmark queries, which were modeled after conventional decision support queries, reveal that redundancies even exist in computations of answers for simple queries, TPC, TPC Benchmark® D (Decision Support), Working draft 6.0, Transaction Processing Performance Council, August 1993, [hereinafter "[TPC93]"], which is incorporated by reference herein (see examples in Appendix A). Conventional database query optimizers generally lack the capability of identifying these redundancies. Hence, the results of one executed query segment are rarely used for processing another query segment. Since decision support queries are typically time consuming to run, especially in a HDBS setting, identifying and sharing computational results judiciously could lead to significant improvements in performance. The example that follows illustrates the kind of redundant computation that is typical of decision support queries.

Consider the following decision support query of the investment broker discussed above: list techno stocks owned by computer engineers that had a higher average sales volume over the past year than the maximum sales volume, which was reached in the first six months of the year, of any oil stock owned by a chemical engineer; and list the name of the computer engineer.

For this example, a relational wrapper is implemented which enables the user to utilize a common language/interface, e.g., a Structured Query Language (SQL) interface. Accordingly, a representative SQL query is shown below. In the example below, Rinvest in a relational database, represented as Rinvest(name, profession, ticker, qty, buyDate, buyPrice). Wstock is a Web data source, represented as Wstock(ticker, category, date, volume, endprice)

SELECT Rinvest.name, Rinvest.ticker
FROM Rinvest, Wstock
WHERE Wstock.cat='Tech' AND
   Rinvest.Profession='Computer Engineer' AND
   Wstock.date<='Dec. 31, 1997' AND
   Wstock.date>='Jan. 1, 19997' AND
   Rinvest.ticker=Wstock.ticker
GROUP BY Rinvest.name, Rinvest.ticker, Wstock.ticker
HAVING AVG(Wstock.volume)>
   (SELECT MAX(Wstock.volume)
   FROM Wstock, Rinvest
   WHERE Rinvest.cat='Oil' AND
   Rinvest.Profession='Chemical Engineer' AND
   Rinvest.ticker=Wstock.ticker AND
   Wstock.date<='Jun. 30, 1997' AND
   Wstock.date<='Jan. 1, 1997')

The above query contains two query blocks. The first query block computes the average sales volume per day of the techno stocks owned by computer engineers over the 1997 year. The second query block computes the maximum sales volume, which was reached in the first six months of 1997, of any oil stock owned by a chemical engineer.

Operationally, one technique of processing this query could involve the following steps which closely reflect the way some relational query optimizers execute the above query:

1. query the web data source to identify the sub-relation of oil stocks in the Wstock source for the first six months of 1997;
2. obtain portfolio information for investors who are chemical engineers;
3. JOIN portfolio information with the volume information for oil stocks obtained from the web;
4. perform a GROUP BY on volume to obtain the maximum volume of sales of any oil stock traded;
5. query the web source to identify the tech stocks in the Wstock source for 1997;
6. obtain portfolio information for investors who are computer engineers,
7. JOIN the investor portfolio information with the volume information of tech stocks;
8. perform a GROUP BY on the ticker to obtain the average volume of sales for each tech stock for each investor; and
9. filter the tech stocks based on whether the average volume exceeds the average volume obtained in step (4).

Step (1) and step (5) are similar. Specifically, they both connect to the web source and obtain information on a certain type of stock. Connecting to the web source multiple times could be costly if the broker is charged based on the number of times he connects to the web source. Hence, it would be profitable to combine these steps together and connect to the web source once. A query could be issued that obtains both the oil stock information and the techno stock information at the same time. The necessary filtering operation could be performed later to separate the oil data from the techno data. Combining steps in this manner would result in the extra overhead of storing the 'temporary data' and the cost of applying the filtering operations. However, a worthwhile trade-off exists between these two methods of performing the steps.

Similarly, steps (2) and (6) can be combined to obtain, with one scan of the Rinvest table, the portfolio information of investors who are either chemical engineers or computer engineers. Such a combination would especially be profitable if the Rinvest table lacks an index. Likewise, steps (3) and (7) can be combined to perform the JOIN operation on the information obtained from the web source and from the investor table. The GROUP BY operation obtained by combining (3) and (7) can also be combined into a single operation. This result can then be used to compute the average volume of technology stocks and the maximum volume of the oil stocks.

If the 'redundancies' were reduced in the manner discussed above, the following steps would be involved in processing the query.

1. Query the web data source to identify the sub-relation of oil stocks and tech stocks at the web source for the year 1997; store the results in a temporary relation.
2. Obtain portfolio information for investors who are chemical engineers or computer engineers; store the results in a temporary relation.
3. JOIN the volume information obtained from the web (temporary relation of step (1)) with the portfolio information (temporary relation of step (2)).
4. Perform a GROUP BY on investor name, investor profession, and volume to obtain the maximum volume, and average volume of sales for the technology and oil stocks and store this in a temporary relation.
5. Scan the temporary relation of step (4) to obtain the maximum volume for the oil stocks owned by chemical engineers.
6. Scan the temporary relation of step (4) to obtain the average volume of the tech stocks owned by computer engineers.
7. Filter the tech stocks based on if the average volume exceeded the number obtained in step (5).

The above example illustrates that various steps in the processing of even some simple decision support queries, can be combined and later compensated with an aim towards improving overall performance.

However, this combine and compensate approach may not always lead to performance improvements. Thus, there is a need for a technique that reduces redundancies by exploiting the similarities in the steps involved when processing a complex decision support query.

One of the early techniques on optimizing queries with common sub-expression is discussed in Hall, P. V. Hall, Common Subexpression Identification in General Algebraic Systems. Technical, Report UKSC 0060, IBM United Kingdom Scientific Center, Nov. 1974, [hereinafter "[Hal74]"]; and P. V. Hall, Optimization of a Single Relational Expression in a Relational Database System, *IBM Journal of Research and Development*, 20(3), May 1976, [hereinafter "[Hal76]"], which are incorporated by reference herein. This work was based on identifying identical common sub-expressions by examining the query syntax using the operator tree approach. Yet, identifying redundant expressions based on the query syntax can have a detrimental effect of performance as it limits the optimizer's choice for generating optimal plans.

The Sellis article, T-K Sellis, Multiple-Ouery Optimization, *ACM Transaction on Database Systems*, 13(1):2352, March 1988, [hereinafter "[Sel88]"], which is incorporated by reference herein, provides a description of an alternative method for optimizing queries. Sellis focuses on optimizing multiple queries submitted as a batch of queries to the database. When multiple queries are submitted for batch execution, Sellis describes two techniques, Interleaved Execution (IE) and Heuristic Algorithm (HA), to identify identical sub-plans. The IE technique generates several redundant temporary relations for each pair of identical sub-plan operators. The HA technique is based on the work by Grant and Minker, J. Grant and J. Minker, On Optimizing the Evaluation of a Set of Expressions, Technical Report TR-916, University of Maryland College Park, July 1980, [hereinafter "[GM80]"]; and J. Grant and J. Minker, Optimization in Deductive and Conventional Relational Database Systems, *Advances in Database Theory*, 1:195–234,1981, [hereinafter "[GM81]"]. To optimize the plan for the batch of queries, such that the global plan is optimized, the HA uses many non-optimal intermediate query plans for each query in a query batch. The HA and the IE techniques combine query plans only when a strict notion of equality exists between the query plans. The techniques also assume that the identical sub-plans can be found easily. Moreover, they assume that the JOIN predicates are simple EQUI-JOINs.

In an attempt to find fast access paths for view processing, Grant Roussopoulos, N. Roussopoulos, The Logical Access Path Schema of A Database, *IEEE Transactions on Software Engineering*, 8(6):563–573, Nov. 1982, [hereinafter "[Rou82a]"]; and N. Roussopoulos, View Indexing in Relational Databases, *ACM Transactions on Database Systems*, 7(2):258–290, June 1982, [hereinafter "[Rou82b]"], which are incorporated by reference herein, provides a framework for interquery analysis based on query graphs introduced by Wong and Youssefi, E. Wong and K. Youssefl, Decomposition: A Strategy for Query Processing, *ACM Transactions on Database Systems*, 1(3):223–241, Sept. 1976, [hereinafter "[WY76]"], which is incorporated by reference herein. Kim, W. Kim, Global Optimization of Relational Oueries, *Query Processing in Database Systems, Springer Verlag*, 1984, [hereinafter "[Kim84]"], describes a two stage optimization procedure similar to that of [GM80]. The unit of sharing in queries in Kim's proposal is a relation and does not extend to arbitrary expressions that are part of a query. Thus, Kim's work is applicable in a restricted setting of single relation queries.

There are several papers that are based on caching query results, for answering future queries. Franklin S. Dar, M. Franklin, B Jonsson, D. Srivastava, and M. Tan. Semantic Data Caching and Replacement, *In Proceedings of the 22nd VLDB Conference*, Mumbai, India, Sept 1996, [hereinafter "[DFJ+96]"], which is incorporated by reference herein, uses semantic data caching to identify data in the client buffer in a client-server environment. Franklin replaces pages in the clients buffer based on the least used semantic data regions and compares this technique with tuple and page caching. Finkelstein, S. Finkelstein, Common Subexpression Analysis in Database Applications, In *Proceedings of the ACM SIGMOD*, 1982, [hereinafter "[Fin82]"], also uses similar methods to cache data, of previously executed queries to answer future queries. Jarke, M. Jarke, Common Subexpression Isolation in Multiple Query Optimization, *Query Pro-cessing in Database Systems, Springer Verlab*, pages 191–205,1984, [hereinafter "[Jar84]"], which is incorporated by reference herein, discusses the problem of common sub-expression isolation. Jarke presents several different formulations of the problem under various query language frameworks. Jarke discusses how common expressions can be detected and used according to their type.

Recently there has been a lot of work in the area of using materialized views to answer decision support queries. There are also related works that address the problem of maintaining materialized views so that they can be maintained efficiently when there are updates to the base tables. Ross et al., K. A. Ross, D. Srivastava, and S. Sudarshan, Materialized View Maintenance and Integrity Constraint Checking: Trading Space for Time, In *Proceedings of the International Conference on Management of Data*, May 1996, [hereinafter "[RSS96]"], which is incorporated by reference herein, addresses the problem of efficiently maintaining materialized views by maintaining other materialized views. Divesh et al., D. Srivastava, S. Dar, S. Jagadish, and A. Levy, Answering Queries with Aggregation Using Views, In *Proceedings of the 22nd International Conference on Very Large Data Bases*, Sept 1996, [hereinafter "[SDJL96]"]; and Levy et al., Levy, A. Y., Rajaraman, A., and Ordille, J. J., Querying Heterogeneous Information Sources Using Source Descriptions, In *Proc. 22nd VLDB Conf.* pages 251–262, 1996, [hereinafter "[LMSS95]"], which are incorporated by reference herein, describe techniques to determine the portions of the query that can be expressed efficiently using the definition of materialized views. Chaudhuri et al., S. Chaudhuri, R. Krishnamurthy, S. Potamianos, and K. Shim. Optimizing Oueries with Materialized Views; In *Proceedings of the IEEE Conference on Data Engineering*, March 1995, [hereinafter "[CKPS95]"], which is incorporated by reference herein, describes the problem of optimizing queries in the presence of materialized views. Chaudhuri identifies portions of the query that can be answered with the materialized view and determines if it is efficient to answer the query using the materialized view.

Papers in the area of Online Analytical Processing (OLAP) have studied the problem of determining the views to materialize in the presence of space constraints so that computation can be speeded up to compute the Cube By operator proposed by Gray et al, J. Gray, A. Bosworth, A. Layman, and H. Pirahesh, Data Cube: A Relational Aggregation Operator Generalizing Group-By Cross-Tab, and Sub-Totals, Technical Report MSR-TR95–22, Microsoft Technical Report, 1995, [hereinafter "[GBLP95]"], which is incorporated reference herein. Harinaryanan et al., V. Harinaryanan, A. Rajaraman, and J. D. Ullman, Implementing Data Cubes Efficiently, In *Proceedings of the ACMSIGMOD* Conference, pages 205–216, May 1996, [hereinafter "[HRU96]"], which is incorporated by reference herein, have studied the problem of computing data cubes efficiently by materializing intermediate results. They have also studied techniques on when to construct indexes on intermediate results, H. Gupta, V. Harinarayanan, A. Rajaraman, and J.

Ullman, Index Selection for OLAP, In *Proceedings of the International Conference on Data Engineering*, May 1997, [hereinafter "[GHRU97]"], which is incorporated by reference herein. H. Gupta, Selection of Views to Materialize in a Data Warehouse, In *Proceedings of the ICDT*, January 1997, [hereinafter "[Gup97]"], which is incorporated by reference herein, develops a theoretical framework for identifying the views to materialize so that they can be maintained efficiently in the presence of storage constraints.

Some of the approaches discussed above, limit the optimizer's choice for generating optimal plans or require a strict notion of equality between query plans. Additionally, some of the plans are only applicable in a restricted setting of single relation queries. Thus, there is a need in the art for an improved query optimizer.

SUMMARY OF THE INVENTION

To overcome the limitations in the prior art described above, and to overcome other limitations that will become apparent upon reading and understanding the present specification, the present invention discloses a method, apparatus, and article of manufacture for optimizing a query.

In accordance with the present invention, one or more queries are optimized. Initially, redundancies in execution steps for the one or more queries are identified. Then, a new set of equivalent execution steps is created by eliminating redundancies in the execution steps. The new set of equivalent execution steps is used to execute the one or more queries when the use results in efficient query processing.

An objective of an embodiment of the present invention is to provide a query optimizing technique that is efficient, and at the same time implementable on top of existing query processing systems in a non-intrusive manner. Another objective of an embodiment of the present invention is to identify the conditions under which combining steps and compensating for them later would lead to an improvement in performance. Yet another objective of an embodiment of the present invention is to exploit the phenomenon of the repeated access of same data sources and the multiple execution of similar processing sequences, inherent in processing complex decision support queries.

BRIEF DESCRIPTION OF THE DRAWINGS

Referring now to the drawings in which like reference numbers represent corresponding parts throughout:

FIG. 7 is a flow diagram illustrating the steps performed by the Cost Based Optimizer to identify execution steps for efficient query processing;

FIG. 8 is a flow diagram illustrating the steps performed by the Cost Based Optimizer to enable scalability;

DETAILED DESCRIPTION OF THE PREFERRED EMBODIMENT

Figure 1:
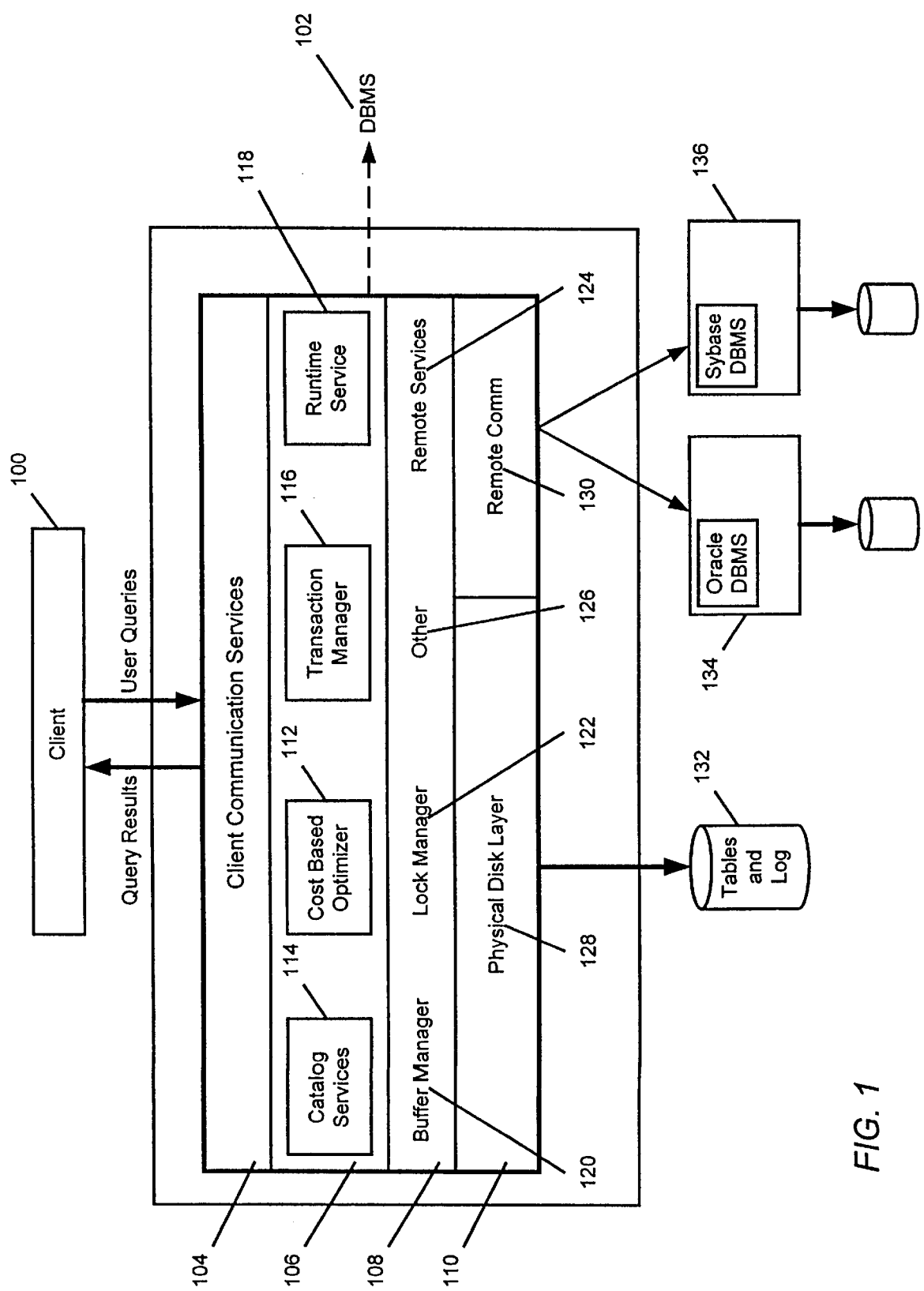
FIG. 1 illustrates an exemplary computer hardware environment that could be used in accordance with the present invention.

In the following description of the preferred embodiment, reference is made to the accompanying drawings which form a part hereof, and which is shown by way of illustration a specific embodiment in which the invention may be practiced. It is to be understood that other embodiments may be utilized as structural changes may be made without departing from the scope of the present invention.

Overview

The present invention modifies a query plan generated by a conventional optimizer to generate a new query plan so that the new query plan results in improved query performance. In particular, the invention identifies and combines 'equivalent' sub-plans within the plan. In this application, the terms 'equivalent' and similar are interchangeable. An encapsulation of similar execution steps combined into one is referred to as a transient view. A transient view is a materialized view that exists only in the context of the execution of a query. The definition of equivalent sub-plans is quite broad and hence, allows for combining a large number of execution steps. The present invention provides efficient techniques for identifying similar plans, combining them into transient views, and filtering the views for compensation.

Once the similar plans are combined into transient views, the present invention utilizes a cost-based technique of evaluating the query plan's performance. This technique is an extension of existing cost infrastructures. The cost-based approach provides a rigorous evaluation of transient views. Namely, the cost-based approach identifies which transient views improve the performance of a query plan.

The present invention may be applied to SQL queries that contain selected SQL operators, such as the SCAN, JOIN, GROUP BY, and UNION operators, as well as a novel RQUERY (Remote Query) operator. The RQUERY operator may be used in systems where queries get executed on remote sources and the data returned is shipped over a wire, e.g., HDBS systems. In such systems a query may incur heavy connection and network costs. The RQUERY operator is especially suitable in the context of systems like the HDBS systems because it does not interfere with the functions of conventional query optimizers. In such systems, the JOIN enumerations of the query optimizer play a crucial role in improving performance.

The following terms are used in this application to described the Cost Based Optimization System:

Plan: The present invention uses the plan tree of a conventional cost-based optimizer as the underlying data structure for representing a query execution plan. The plan tree corresponding to a query Q can be thought of as a directed acyclic graph (DAG) whose internal nodes correspond to the plan operators and the leaf nodes correspond to the relations at the source. The plan tree is also similar to a DAG because it may have common sub-expressions. The algebraic expression computed by the root node of the tree is equivalent to Q.

Properties: Associated with a plan is a set of properties that provide meta-information on the work done by the plan.

Meta-information summarizes the various tasks underlying the plan and their cost. Table 1 shows these properties. Specifically, the first column of Table 1 lists the properties. The second column of Table 1 list notations, where the subscript i is a number that ranges from 1 to n. The third column provides an example of a property.

TABLE 1

Plan Properties

| Property | Notation | Example |
| --- | --- | --- |
| Tables in the plan | $T_i$ | Relation T1, T2 |
| Columns selected | $Cols_i$ | C1, C2, C3 |
| Join predicates | $J\ P_i$ | T1.C1 RelOp T2.C2 |
| Set of simple predicates | $S\ P_i$ | T1.C1 RelOp Constant |
| Aggregation Functions | $Af_i(Exp)$ | SUM, MIN, MAX, AVG |
| Columns in the group by list | $GC_i$ | GROUP BY C1, C2, C3 |
| Data source plan executes | $S_i$ | DB2, WEB SERVER, ORACLE |
| Cost of executing plan | $Cost_i$ | Time in ms |
| Number of result rows | $Card_i$ | Number of Tuples |

These properties correspond to the information necessary to reconstruct a single block query for which the plan was generated. In the preferred embodiment of the invention, transient-views are created that correspond to single block queries. The single block query consists of a SELECT list that contains columns and aggregation functions, a set of tables in the from clause, and a set of simple predicates (col relop value) and JOIN predicates. The GROUP BY list contains a set of columns that are a super-set of the columns on the SELECT list. Each entity required to construct the single block query is listed in the property list. Additionally the cost and the cardinality information are also maintained Operators: The following operators are building blocks for the query plan: SCAN, JOIN, GROUP BY, RQUERY. These operators were chosen because they sufficiently describe the plan tree of a single block query with the properties in Table 1 above. The SCAN, JOIN, and GROUP BY operators do not need any introduction. RQUERY is a novel operator that is unique to a setting consisting of remote data sources. It encapsulates the job (sub-plan) to be performed at a remote source. Thus, the unit of work 'beneath' this operator is performed at the remote source, and the data that is returned as a result of this execution is shipped to the local site. Each operator receives a plan or a set of plans and their associated properties as input and produces a plan with a modified set of properties as output. Thus, the properties of a plan are recursively built using the plan operators. Table 2 presents the operators in column1. The input properties associated with the operators are presented in column 2 of Table 2.

TABLE 2

Operators and Properties

| Operator | Input Parameter |
| --- | --- |
| SCAN | Type (scan vs iscan) |
| | Name of Table |
| | Simple Predicates |
| | Columns selected |
| JOIN | Method (merge, nested . . . ) |
| | Outer Plan |
| | Inner Plan |
| | Join Predicates |
| GROUP BY | Columns in select |
| | Aggregation Functions |
| | Group By list |
| RQUERY | Input plan |
| | Data source |

To illustrate the above concepts, an example of a query and its corresponding plan tree is presented below.

Example: Consider the following query in the context of the investor's application. Display the investor names and their current investment value in technology stocks and oil stocks for those investors for whom the average trading volumes of the technology and oil stocks in their portfolio was higher than the market trading volume of oil and technology stocks. Consider only those stocks in the portfolio that were bought prior to 'Oct. 1, 1997'.

To better understand the syntax for this query, two views are defined. Note, that it is not necessary to define views to express the query. Views are defined in the application to illustrate the syntax of the query.

The following view retrieves the name, the average volume, and the net value of the investments in technology stocks of companies located in the silicon valley.

```
CREATE VIEW  Tech (invest_name, invest_id, vol, cnt, value) AS
    SELECT   Rinvest.name, SUM(Wstock.volume), COUNT
             (Wstock.volume),
             SUM (Rinvest.qty*Wstock.price)
    FROM     Rinvest, Wstock
    WHERE    Rinvest.ticker=Wstock.ticker
    AND      Wstock.cat='Tech'
    AND      Wstock.date ='11/03/97'
    AND      Rinvest.buy <'10/01/97'
 GROUP BY    Rinvest.name
```

The following view retrieves the name, the average volume, and the net value of the investments in technology stocks of companies located in the silicon valley.

```
CREATE VIEW  Oil (invest_name, invest_id, cnt, value) AS
SELECT       Rinvest.name, Rinvest.id, AVG(Wstock.volume),
             COUNT(Wstock.volume),
             SUM(Rinvest.qty*Wstock.price)
FROM         Rinvest, Wstock
WHERE        Rinvest.ticker=Wstock.ticker
AND          Wstock.cat='Oil'
AND          Wstock.date='11/03/97'
AND          Rinvest.by <'10/01/97'
GROUP BY     Rinvest.name
SELECT       Oil.invest-name, Oil.value, Tech.value
FROM         Oil. Tech
WHERE        Oil.invest_id = Tech.invest_id
AND          (Oil.vol+Tech.vol)/(Oil.cnt+Tech.cnt)>(SELECT
             avg(Wstock.volume)
FROM         Wstock
WHERE        (Wstock.category='Tech'
OR           Wstock.category='Oil'
AND          Wstock.date = '11/03/97'
```

Hardware Environment

FIG. 1 illustrates an exemplary computer hardware environment that could be used in accordance with the present invention. In the exemplary environment, a Client computer system 100 transmits user queries to a DBMS 102. The Client computer 100 may be comprised, inter alia, of one or more processors, one or more input devices (e.g., a mouse or keyboard), one or more data storage devices (e.g., a fixed or hard disk drive, a floppy disk drive, a CDROM drive, or a tape drive), or other devices.

The user queries represent commands for performing various search and retrieval functions, termed queries, against the DBMS 102. The DBMS 102 resides on a computer system. In one embodiment of the present invention, these queries conform to the Structured Query Language (SQL) standard and invoke functions performed by the DBMS 102. The SQL interface has evolved into a standard language for DBMS 102 and has been adopted as such by both the American National Standards Institute (ANSI) and the International Standards Organization (ISO). The SQL interface allows users to formulate relational operations on the tables either interactively, in batch files, or embedded in host languages, such as C and COBOL. SQL allows the user to manipulate the data. Those skilled in the art will recognize, however, that the present invention has application to any DBMS, whether or not the DBMS uses SQL.

In the preferred embodiment of the present invention, the DBMS 102 is comprised of layers 104, 106, 108, and 110. The Client Communication Services layer 104 receives the user queries and forwards them to the next layer 106. A Cost Based Optimizer 112 works in conjunction with a Catalog Services module 114, a Transaction Manager 116, and a Runtime Service module 118 to process the user queries. The Runtime Service module 118 executes the user queries in conjunction with the next layer 108, containing a Buffer Manager 120, a Lock Manager 122, a Remote Services module 124, and other modules 126. The Buffer Manager 120 and other modules work in conjunction with a Physical Disk Layer 128 to connect to a database 132 and retrieve data from the database 132. The Remote Services module 124 and other modules work in conjunction with the Remote Comm module 130 to connect to remote systems 134 and 136, each of which is connected to separate databases.

Generally, the DBMS, the SQL statements, and the instructions derived therefrom, are all tangibly embodied in a computer-readable medium, e.g. one or more of the data storage devices. Moreover, the DBMS, the SQL statements, and the instructions derived therefrom, are all comprised of instructions which, when read and executed by a computer system, causes the computer system to perform the steps necessary to implement and/or use the present invention. Under control of an operating system, the DBMS software, the SQL statements, and the instructions derived therefrom, may be loaded from the data storage devices into a memory of a computer system for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Architecture

Figure 2:
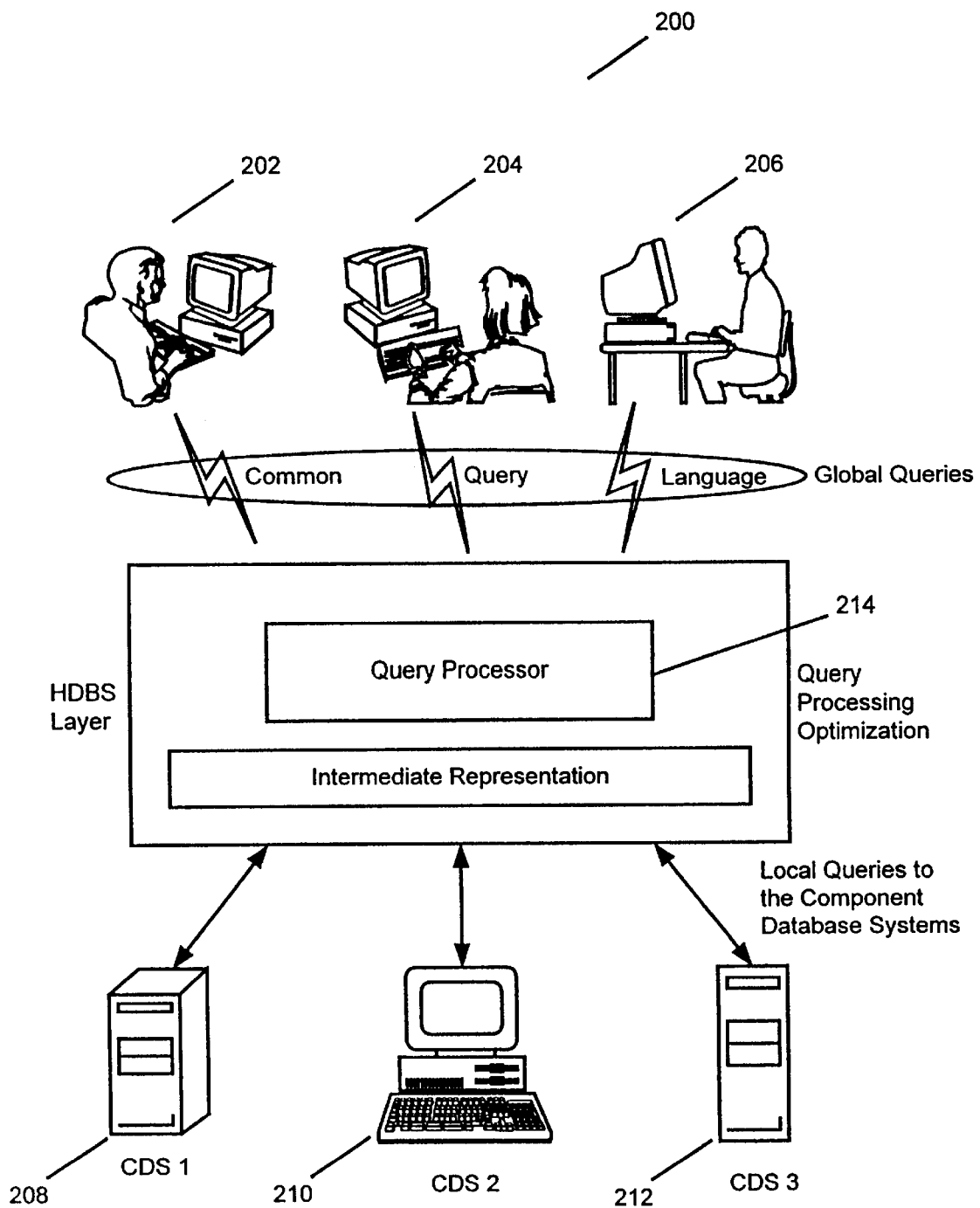
FIG. 2 illustrates a Heterogeneous Database System Architecture that could be used in accordance with the present invention.

In this application, the Cost Based Optimizer 112 is implemented and realized in the context of the HDBS architecture 200 shown in FIG. 2. Those skilled in the art will recognize that other architectures may be used without departing from scope of the present invention.

The HDBS architecture 200 is somewhat similar to the DataJoiner multi-database system, Shivakumar Venkataraman and Tian Zhang, DataJoiner Optimizer: Optimizing Query for Heterogeneous Database Systems, VLDB 98, New York, [hereinafter "[ea97]"], which is incorporated by reference herein. The HDBS architecture 200 provides a single database image to tables (or table views obtained via relational wrappers) in multiple data sources. The database clients, 202, 204, and 206 access remote tables as though they were local, through user defined aliases. The presence of remote data sources 208, 210, and 212 is completely transparent to the user. The user submits queries as though the queries were directed to local tables and receives results as though they would have been generated on local tables. Queries submitted to the HDBS may access both the local and remote tables. The HDBS query processor 214 rewrites these queries, applies cost-based optimization to determine which parts of the queries should be executed locally, and which should be executed on the remote sources 208, 210, and 212. The parts of the query that should be executed remotely are translated to the lingua-franca (in the case of SQL databases, to the appropriate SQL dialects) of the remote sources 208, 210, and 212 and sent to the remote sources 208, 210, and 212 for execution. The results received are translated, converted to local types, and combined with the results of queries on local tables and returned to the clients 202, 204, and 206.

Query Optimizer

Figure 3:
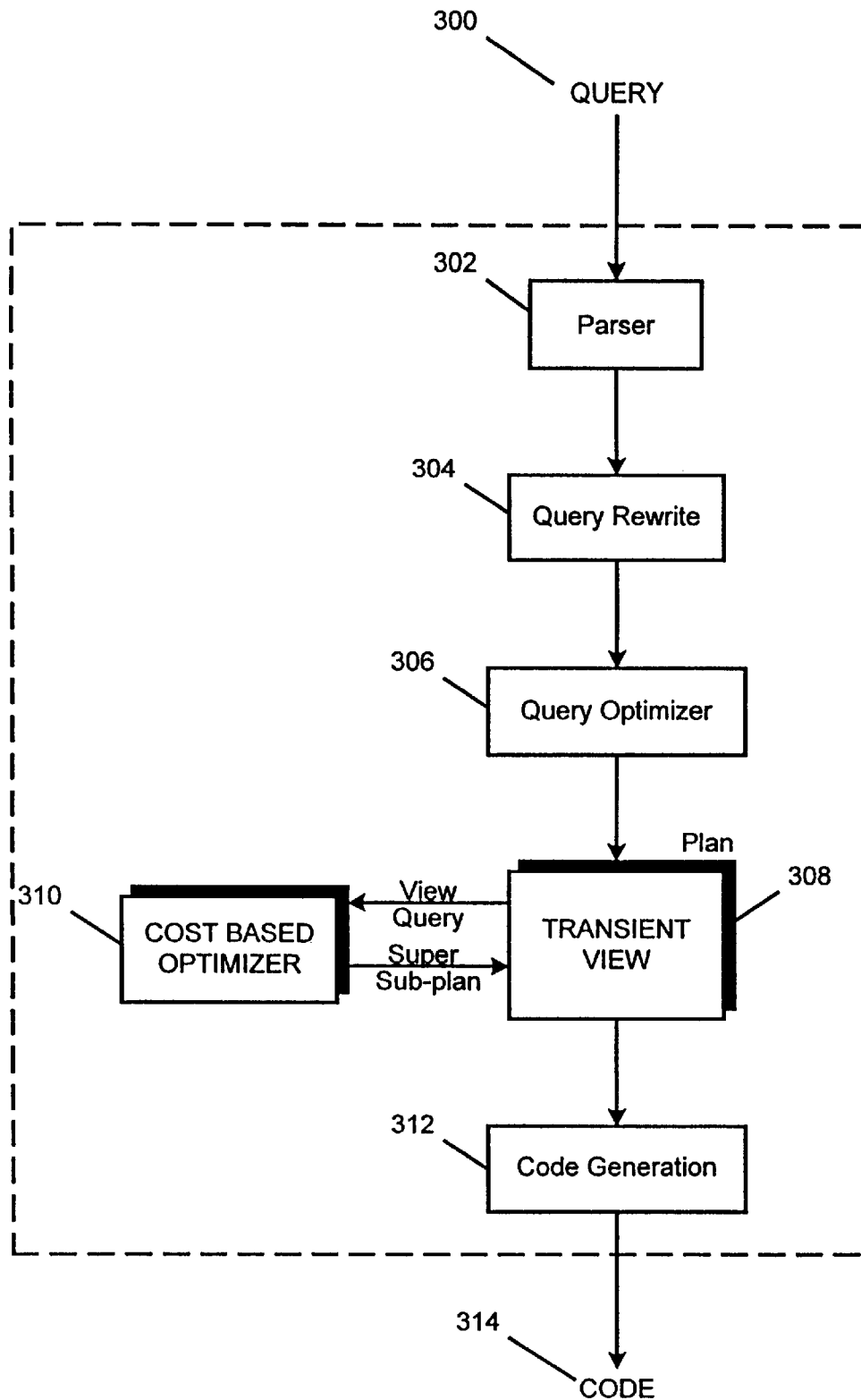
FIG. 3 is a flowchart of an optimizer architecture that could be used in accordance with the present invention.

The Cost Based Optimizer 112 is based on the well-known STARBURST relational query optimizer, P. Gassner, G. M. Lohman, and Y Schiefer, B. Wang, Query Optimization in the IBM DB2 Family, *Data Engineering Bulletin*, 16(4), 1993, [hereinafter "[GLS93]"], which is incorporated by reference herein, extended to a HDBS architecture 200 setting. FIG. 3 shows the stages that a query goes through in the optimizer before it is executed. Following is a brief description of how a query plan is created:

Parser: A query 300 from a user is first parsed, semantically analyzed, and translated into a chosen internal representation, as represented by block 302

Query Rewrite: The output of the parser is transformed by a set of rewrite rules, as represented by block 304, H. Pirahesh, J. M Hellerstein, and W. Hassan, Extensible/Rule Based Query Rewrite Optimization in Starburst, In *Proceedings of the ACM SIGMOD Conference*, pages 39–48, 1992, [hereinafter "[PHH92]"], which is incorporated by reference herein. These rewrite rules are usually heuristics aiding in transforming the query representation into a better form in order for the query optimizer 306 to search a larger space for an optimal plan.

Query Optimizer: The query optimizer uses the rewritten query as input to generate query plans based on the capabilities of the remote data source, as represented by block 306.

Code Generation: Code is generated for those portions of the query that needs to be executed locally as well as remotely, as represented by block 312. The output 314 is also shown.

FIG. 3 shows how the transient view module 308 fits in the above query processing architecture. The transient view module 308 takes as input the optimizer plan and produces a plan that consists of transient views. The Cost Based Optimizer 310 (see 112 in FIG. 1) performs a comparison between the performance of the plan that contains transient views and the performance of the plan produced by the query optimizer 306 to determine whether the transient views improve the performance of the plan.

Equivalence of Sub-plans

Figure 4:
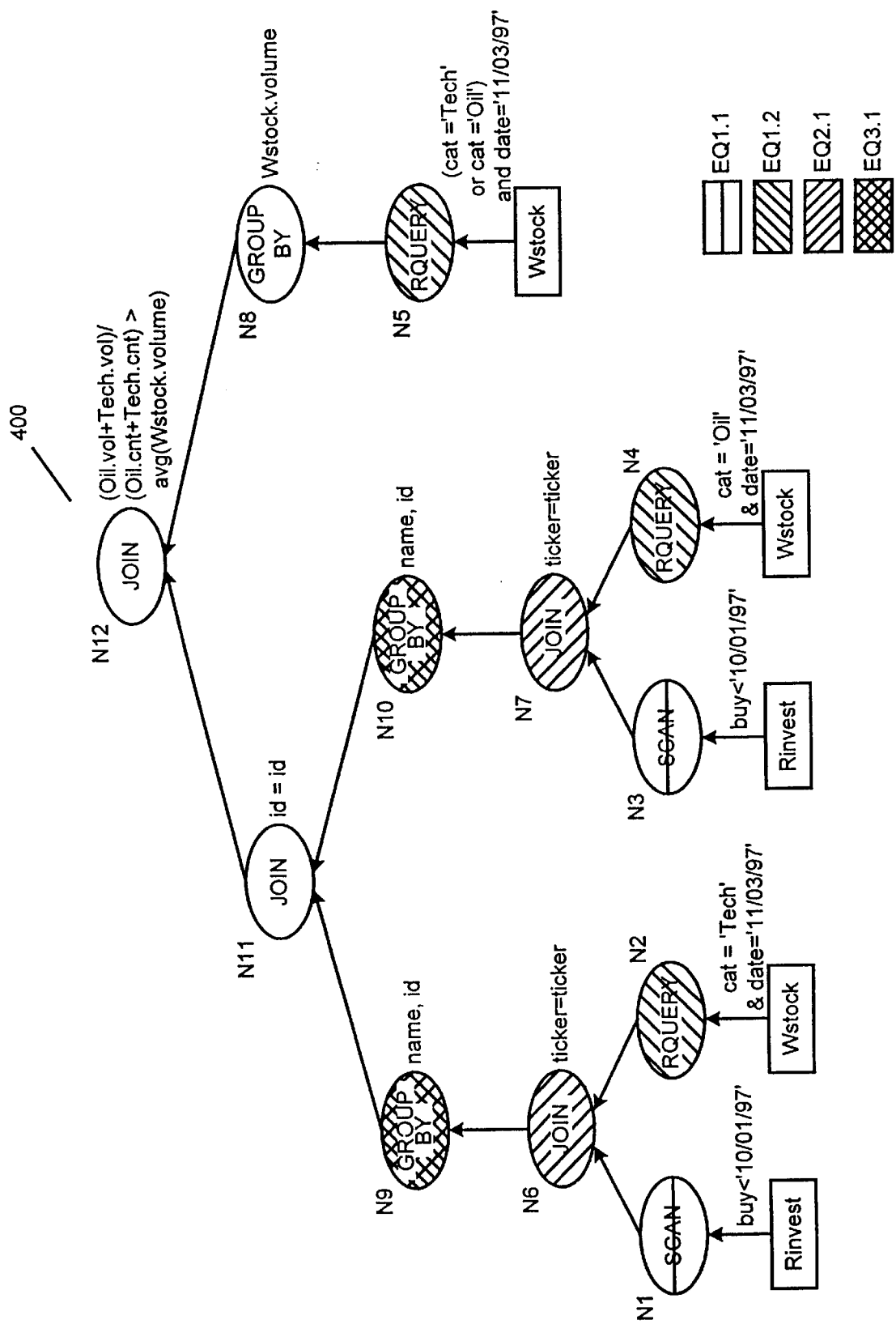
FIG. 4. illustrates an exemplary query plan which was produced by a conventional query optimizer.

FIG. 4 shows a query plan tree that is generated by the query optimizer 306. The nodes in the plan tree generated by the query optimizer 306 are labeled so that equivalent nodes can be identified. Transient materialized views are created from the query optimizer 306 plan tree. The transient views are used to avoid redundant computations by combining redundant sub-plans. The preferred embodiment of the invention identifies redundant sub-plans that represent one query block. Specifically, equivalent parts of the query plan are identified and combined so that redundancy is avoided.

The notion of equivalence is quite broad in that the combined parts might have a result that is a superset of the result of each subpart. For instance, two plan trees may be identified as equivalent if a set of properties can be defined which represent a single block query that can produce the union of the result of the two plan trees.

For example, two scan operators that operate on identical tables but apply different predicates would be considered equivalent. A new scan operator can be defined that can apply the combination of the two predicates, and obtain the results that would have been generated by the two scan operators. The predicates that the scan operators originally had as filters can be applied on the result generated from the new scan operator.

Note that the problem of identifying equivalent sub-plans in a plan that was generated by the query optimizer 306 is essentially the problem of identifying equivalent sub-trees in a tree. Equivalence is defined based on induction. Equivalence of nodes is the base case. The following is the definition of equivalence.

Let $n_1$ and $n_2$ be two nodes of a plan tree T. A relation~on nodes of T is defined as follows. For each case, if the requirements below are met, then $n_1$~$n_2$.

1. tables—$n_1$ and $n_2$ should be identical;
2. SCAN operators—their properties should agree as defined in Table 3;
3. JOIN operators—their properties should agree as defined in Table 4;
4. GROUP BY operators—their properties should agree as defined in Table 5; and
5. ROUERY operators—their properties should agree as defined in Table 6.

The relation≡is the symmetric, reflexive, transitive closure of~. Thus, ≡ is an equivalence relation. Note that by the above definition and the requirements imposed on the properties, the equivalence of two nodes $n_1$ and $n_2$ implies equivalence of the two sub-plans that respectively have $n_1$ and $n_2$ as their root.

The rationale behind the choice of the equivalence conditions is now presented.

SCAN: A scan operator operates on one table and applies a set of predicates to the table and produces a set of columns as the result. Two scan operators are equivalent if they differ only in their column selected and the simple predicates that are applied. The scan operator that produces the union of the result of the two scans consists of the union of the columns in the two scan operators and has predicates that is the OR of the predicates in the two scan operators. The filter query for each scan operator projects out the columns and applies the predicates required by the SCAN.

TABLE 3

Scan Properties

| Property | Condition |
| --- | --- |
| Scan type | Identical (eg: table or index scan) |
| Table scanned | Identical |
| Set of simple predicates | does not matter |
| Columns selected | does not matter |

JOIN: A join operator takes two plans as input and joins the two plans based on one or more predicates. There are several join methods to implement this operator. Two join operators are defined to be equivalent if the join method employed by them is identical. The inner plans for the join operators have to belong to the same equivalence class. The outer plans also have to belong to the same equivalence class. The join predicates have to be identical. Pulling up all the simple predicates from the two join operators produces two trees that are identical, except, for the columns that are fetched and the pulled up predicates. This is because, every node, below the join operator is equivalent The combined join operator for these two join operators can be viewed as one that has an identical tree but has the OR of the simple predicates in these two plans applied. The filter queries consists of applying the simple predicate filter and column projection to the result of the combined join operator.

TABLE 4

Join Properties

| Property | Condition |
| --- | --- |
| Join method | Identical |
| Outer plan | Equivalent |
| Inner plan | Equivalent |
| Join predicates | Identical |

GROUP BY: The GROUP BY operator takes an input plan and applies aggregation functions to the columns of the input plan by grouping the columns on the GROUP BY list. Two GROUP BY operators are considered to be equivalent if the plans that are input to the GROUP BY are in the same equivalence class. Specifically, the columns in the GROUP BY list of one operator must be a complete subset of the columns in the GROUP BY list of the other group by list. This restriction helps to confirm whether combining the two GROUP BY operations improves performance. For the disjunctive predicates that are not identical in the plan's input to the GROUP BY operator, columns referenced in the simple predicate are placed in the SELECT list and the GROUP BY list property of the combined plan. This ensures that the aggregation function compute the right result.

TABLE 5

Group By Properties

| Property | Condition |
|---|---|
| Input plan | Equivalent |
| Columns in the SELECT list | does not matter |
| Aggregation Functions | does not matter |
| Group by list | containment and add columns from the simple predicate |

RQUERY: The remote query operator represents the boundary with the remote database. It represents the point at which the results are fetched from the remote database. Two remote query operators are equivalent if the plans that the remote query operation are a part of are in the same equivalence class and the two queries are directed towards the same data source.

TABLE 6

Rquery Properties

| Property | Condition |
|---|---|
| Input plan | Equivalent |
| Data source where plan executes | Identical |

Multi-Block Queries

Recall from the discussions in the previous section that each of the plan operators yields a plan with a set of properties that can be described as in Table 1. However, Table 1 is not sufficient to describe the properties that result from the application of certain operators such as UNION. The property of the plan after applying the UNION operator consists of the union of the properties of the individual sub-plans and hence cannot be described using the table. These queries are called multi-block queries. Multi-block queries can be handled in the framework by extending the property by adding a property set that represent the union of the properties of the plans input to the UNION operator. The handling of Multi-block queries will not be further discussed here. However, a notion of equivalence can be easily arrived at for the UNION queries by restricting attention to UNION queries that operate on identical plans.

Technique for Identifying Equivalence

In this section, an efficient technique for identifying equivalent sub-plans in a plan generated by the query optimizer 306 is described. The technique makes use of the notion of equivalence (~) introduced in the previous section. It is a tree traversal that identifies equivalence classes. An example of the technique Equivalence Class Generation follows. This technique is based on a level-by-level walk of the plan tree generated by the query optimizer 306, starting with the leaf level, and identifying the nodes which are equivalent at that level, and using this information to identify equivalent nodes at the next level and so on. A query plan Tree T is input to the query optimizer 306. The equivalence class of nodes in T with respect to (~) is the output of the query.

Begin
    cur__node=left most leaf;
    lvl=0
    While (cur__node!=root)
        while there are no more nodes at level lvl for each unmarked node n at level lvl
        if (cur__node~n) add__node__to__eq__class (lvl, cur__node, n)
        // adds node n to the equiv__class[lvl][cur__node]
        mark (cur__node); mark (n)
    cur__node=next unmarked node at level lvl; lvl=lvl+1;
    cur__node=leftmost node at level lvl;
end The above technique requires a pass of each node exactly once and hence has a cost that is linear in the number of nodes in the plan tree. FIG. 4 illustrates a query plan along with the equivalence classes identified by the technique. The nodes representing the same equivalence class are shaded.

Cost Considerations for Materializing Transient-Views

The first phase of the technique may generate several equivalence classes. The members of each equivalence class may contain several sub-plans that are similar. A materialized view can be used to answer the queries representing the sub-plans in each equivalence class. The materialized view contains the union of the results of all the sub-plans. The results produced by each sub-plan can be obtained by applying filters to the materialized view. For each equivalence class it has to be decided whether or not to use the materialized view. A cost model is used to determine whether the equivalence class will improve performance to materialize the transient-view.

The steps taken to determine whether to materialize a transient-view are discussed below. Initially, the set of equivalence classes are pruned, so that temporary tables are not unnecessarily created. Once the set of equivalence classes are pruned, two problems must be solved. First, the properties for the views to be materialized are determined for each equivalence class, and a query execution plan is generated that represents the union of the results of the queries in that sub-plan. Second, it is determined whether the performance will improve if this view is materialized. These steps are discussed in detail in the following paragraphs.

The discussion of the different equivalence pruning techniques is postponed to the end of this section, since it is important to understand how the materialized views are generated. The technique for determining the query execution plan and cost for the materialized view is described first.

Transient-View Plan Generation

Each sub-plan in an equivalence class is represented by a set of properties. These properties are summarized in Table 1. To determine whether to materialize a view for an equivalence class, the properties of the transient-view are first determined, an optimal plan for the view is generated, and the plans for filtering the results of the view for each sub-plan in the equivalence class.

The property description of each sub-plan in an equivalence class is used to generate a property list that corresponds to the plan which generates the union of the results of the sub-plans in that class. The plan that corresponds to the union of the results of the sub-plans in a class is referred to as the "super-sub-plan".

Table 7 shows the combined properties of a view that generates the union of the results of two sub-plans in an equivalence class.

TABLE 7

Plan Properties

| Property | Notation | View Property |
| --- | --- | --- |
| Tables in the plan | $T_{view}$ | $T_i$ |
| Columns selected | $Cols_{view}$ | $Cols_1 \cup Cols_2$ |
| Join predicates | $J P_{view}$ | $J P_i$ |
| Selection predicates | $S P_{view}$ | $S P_1$ OR $S P_2$ |
| Aggregation Functions | $A F_{view}$ | $AF_1(Exp) \cup AF_2(Exp)$ |
| Columns in the group by list | $Gc_{view}$ | $GC_1 \cup GC_2 \cup Addnl_i$ |
| Data source plan executes | $S_{view}$ | $S_i$ |
| Cost of executing plan | $Cost_{view}$ | To be determined |
| Number of result rows | $Card_{view}$ | To be determined |

The list of properties and the description of how to combine them and generate a property list for the transient-view is discussed below.

Tables: The sub-plans in an equivalence class have the exact same tables, therefore the tables in the transient-view have the same tables represented here by $T_i$.

Columns: The columns in the SELECT list is the union of the columns in the two sub-plans.

Join Predicates: The join predicates in two sub-plans in all equivalence class are identical by definition. Therefore, the join predicate of one sub-plan is used.

Predicates: $SP_i$ is the representation of conjuncts of simple predicates of the form Col RelOp value in the two plans. The predicate property of the combined plan, $SP_{view}$, is obtained by ORing $SP_1$ and $SP_2$. If either $SP_1$ or $SP_2$ is null, then the predicate property of the combined plan is also null. The combined predicate is then optimized by applying standard predicate optimization techniques, to remove redundancy, and merge predicates.

Aggregation Function: The aggregation function is the union of the aggregation functions of the two plans. If two aggregation functions are identical, one of the functions can be removed.

Group By List: The group by list by definition should be a superset of the columns in the SELECT list. The group by list of the combined plan is the union of the group by list of the two sub-plans. Duplicate columns are removed from the group by list.

Data Source: The data source that the query corresponding to the plan executes on is the same.

The plan properties generated for a view representing two sub-plans can be extended to apply to a third sub-plan and so on until the plan property for the transient view representing all sub-plans in the equivalence class is obtained. The property information of the transient view does not contain the cost and the cardinality information. In order to get this information, the query that represents the transient view is first generated from the property list of the transient view. This query is shown below:

SELECT $COls_{view}$, $Af_{view}(Exp)$
FROM $T_{view}$
WHERE $JP_{view}$
AND $SP_{view}$
GROUP BY $GC_{view}$, The query is then optimized, and the execution plan, the cost, and cardinality information is obtained for the transient view. The result of the transient view contains data needed by all the sub-plans in the equivalence class. It is important to note that only the portion of the query representing the transient-view is optimized and not the entire query.

Filter Plans

The results generated by the query plan representing the transient views contains data that is the union of the results of the sub-plan belonging to the equivalence class. Therefore, appropriate filter plans need to be applied to obtain the results required for each sub-plan. In order to do this, filter queries are defined for each sub-plan in the equivalence class. The filter query for each sub-plan in an equivalence class is defined based on the transient-view and the properties of the sub-plan. The filter query is defined below:

SELECT $Cols_i$, $AF_i(Exp)$
FROM MATVIEW
WHERE $SP_i$
GROUP BY $GC_i$

The Cost Based Optimizer 112 is used to generate plans for the filter query for each sub-plan in the equivalence class. This is necessary for two reasons. First, the plan information is needed to generate executable code for the filters. Second, the cost information of the filter plan is needed to determine if it is efficient to use transient-views to optimize the query. The cost property of the filter operations for each sub-plan is represented as $FilterCost_i$.

Cost and Cardinality Information

An optimizer cost model is used to decide whether it would be beneficial to materialize a view. The cost of executing the sub-plans in the equivalence class is compared to the cost of materializing a "super-sub-plan" and answering the queries represented by each sub-plan by applying a filter on top of the materialized view. The following equation represents the comparison.

$$COST_{matview} + \sum_{i=1}^{n} Filter_i < \sum_{i=1}^{n} Cost_i$$

If the cost of materializing the view and applying the filters is less than the cost of executing the sub-plan, the view is materialized.

FIG. 7 is a flow diagram illustrating the steps performed by the Cost Based Optimizer 112 to identify execution steps for efficient query processing. In Block 700, the Cost Based Optimizer 112 identifies redundancies in an original query's execution steps. In Block 702, the Cost Based Optimizer 112 creates a new set of equivalent execution steps by eliminating redundancies. In Block 704, the Cost Based Optimizer 112 estimates the cost of the original query's execution steps. In Block 706, the Cost Based Optimizer 112 estimates the cost of the equivalent execution steps. In Block 708, based on the cost determinations, the Cost Based Optimizer 112 determines whether the original query's execution steps or the equivalent execution steps are to be used for efficient query processing.

Equivalence Class Pruning

The first phase of the technique may generate several equivalence classes at each level. The classes at the first level contain single table sub-plans. At the second level, the sub-plans in the equivalence class, at higher levels, are based on the presence of smaller equivalent sub-plans at lower levels. Since the equivalence classes at higher levels contain sub-plans that overlap, it may not be possible to fully utilize the performance improvement, if all the equivalence classes are materialized.

In this example, all equivalence classes generated by the first stage are selected. This could result in sub-optimal plan. FIG. 4 shows an exemplary plan 400 generated by the Query Optimizer 306, and set of equivalence classes generated by the first phase of the technique. FIG. 4 shows twelve nodes, N1 through N12. The Nodes belonging to the same equivalence class are shaded with the same color. The nodes that are in the same equivalence class are:

Level 1: EQ1.1: {N1, N3}, EQ1.2: {N2, N4, N5}, EQ1.3: N5;

Level 2: EQ2.1{N6, N7}, EQ2.2{N8}; and

Level 3: EQ2.3{N9, N10}.

Figure 5:
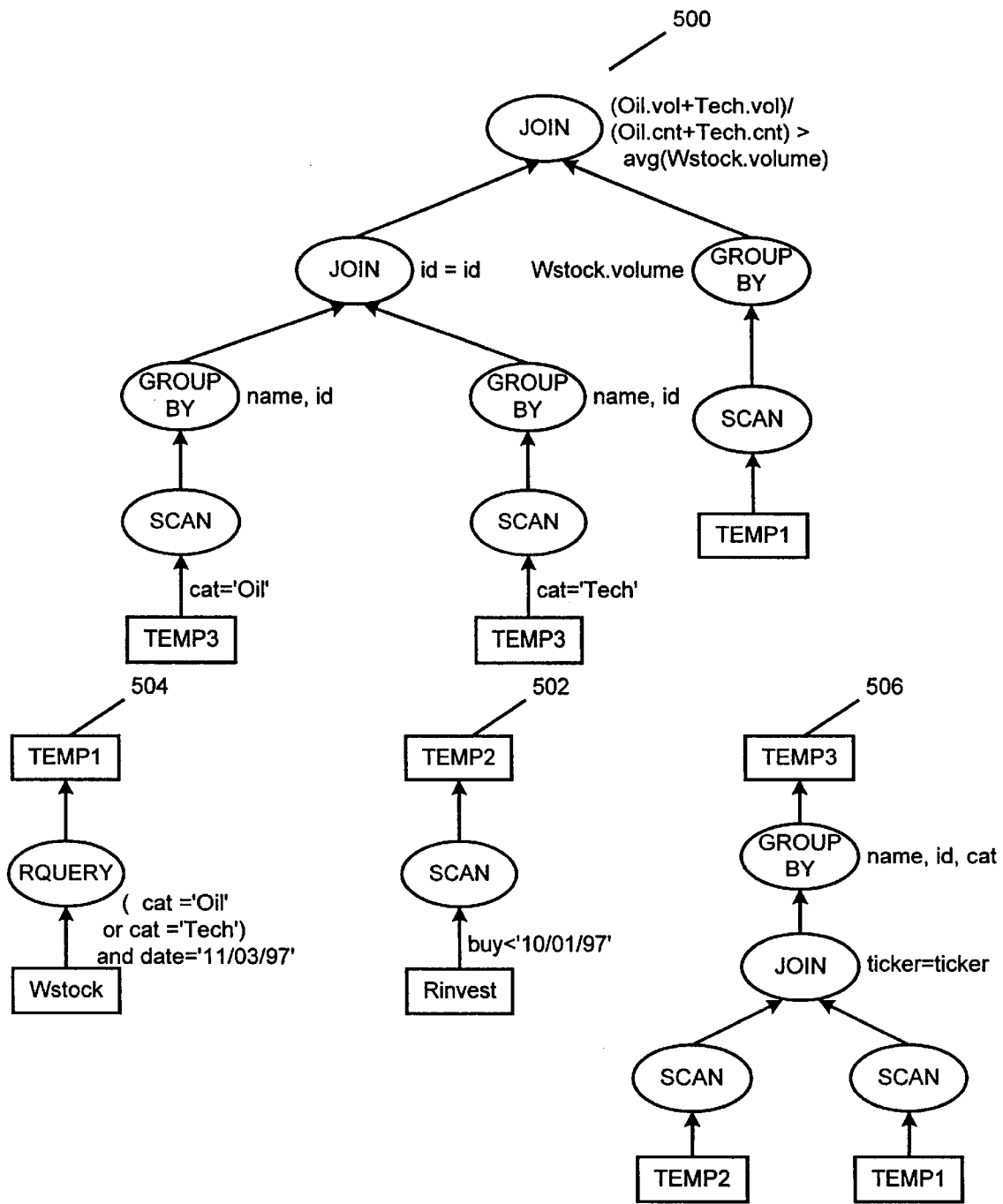
FIG. 5 illustrates an exemplary query plan which was produced by combining all the similar sub-plans in the conventional query plan.

For this query there are three equivalence classes at level 1. The equivalence class EQ2.1 at level 2 contains two JOIN operators that operate on the members of the level 1 equivalence class. At the third level EQ2.3 has two group by nodes. If views are materialized for all the equivalence class, the resulting plan 500 may not improve performance, as represented by FIG. 5. In FIG. 5, the materialized views for EQ1.1 502, which does not contribute to improving the performance, are unnecessarily generated. EQ.1.1 is not represented in the new plan 500. However, the views for EQ.1.2 504 and the views for EQ2.3 506 may improve performance.

The pruning technique starts by selecting those equivalence classes at the highest level that have more than one node. This ensures that those equivalence classes are chosen which have nodes that share a lot of work in common. The Cost Based Optimizer 112 is used to determine whether the plan can be improved by using the equivalence class at the highest level. If it is determined that performance cannot be improved, they are removed from the selected list, otherwise they are added to the selected set. For equivalence classes at each level, the nodes are checked to determine if any of the nodes that are members of the equivalence class are the children of the nodes in the equivalence classes already selected. If all the members are present in the classes selected earlier, this equivalence class is pruned, otherwise, the cost of the effect of using this class to optimize the plan is determined and the class is added to the selected list of equivalence classes.

Figure 6:
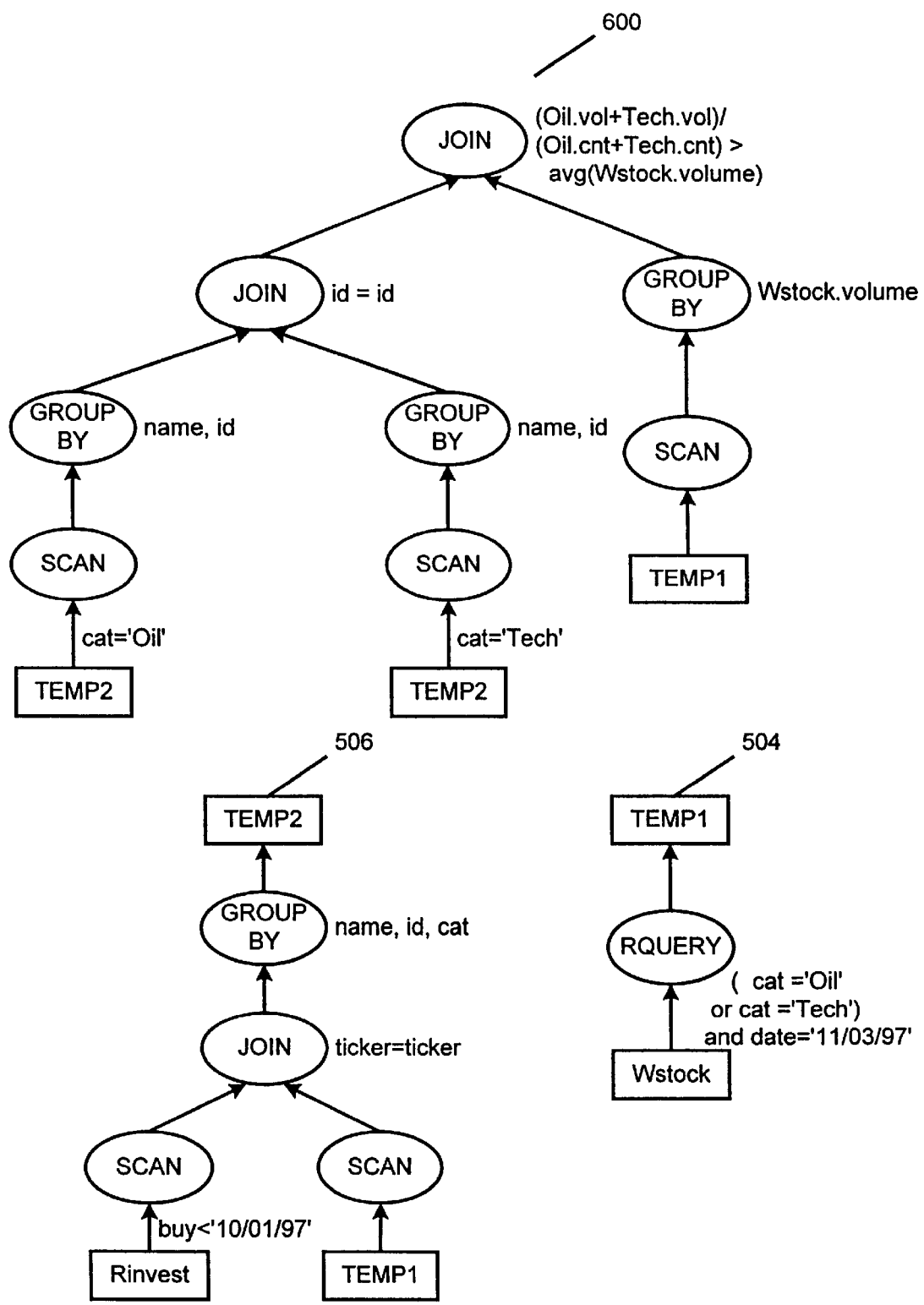
FIG. 6 illustrates exemplary query plans produced in accordance with the present invention.

This enables selection of a non-overlapping set of equivalence classes. When there are equivalence classes that overlap, the pruning technique checks to determine whether all the members in the class are accounted for by equivalence classes at higher levels. This ensures that no optimization opportunities are missed. Also, equivalence classes that could potentially reduce the benefit of sharing computations are not materialized. FIG. 6 shows the new plan 600 that is generated when the pruning technique is used to prune the set of equivalence classes. It avoids materializing the sub-plan for the equivalence class EQ1.1 502. However, both EQ1.2 504 and EQ2.3 506 are a part of the new plan 600.

Scalability of the Cost Based Optimizer

One of the important problems in the area of answering queries using views is the following: Given a set of queries that are most often posed against a database, what is the correct set of views that should be materialized in order to answer queries efficiently? The transient-view based optimization technique can be applied in the context of this view selection problem in the following manner. Given a set of queries or, equivalently, a set of plans corresponding to the queries, the Cost Based Optimizer's 112 technique for generating the transient view can identify the portions of the queries that are redundantly computed and recommend the transient view that should be materialized in order to improve performance. That is, given a set of queries, the Cost Based Optimizer 112 can generate a "generic" view (i.e., a "generic" set of execution steps) that can be used by each of the queries in the set or by a new query.

In the context of the view selection problem, the views the Cost Based Optimizer 112 recommends would essentially be the views that should be materialized. Thus, the Cost Based Optimizer 112 can be leveraged to build a system that, given a set of queries, will recommend the set of views to be materialized for optimum query performance.

FIG. 8 is a flow diagram illustrating the steps performed by the Cost Based Optimizer 112 to enable scalability. In Block 800, the Cost Based Optimizer 112 receives a set of queries. In Block 802, the Cost Based Optimizer 112 identifies a generic view for the received set of queries. In Block 804, the Cost Based Optimizer 112 determines, for any query, whether the query can be processed using the generic view, and, if the query can be processed using the generic view, the Cost Based Optimizer 112 processes the query using the generic view.

Performance

The Cost Based Optimizer 112 for using transient views to optimize queries was implemented in DataJoiner [ea97], a heterogeneous commercial relational database system based on DB2. The TPCD benchmark queries were used to evaluate the performance impact of using transient views. Two additional queries based on the TPCD benchmark schema were also formulated. The benchmark queries were evaluated on a one processor RS6000 machine and on an AIX 3.2 platform, running DataJoiner. Each query was ran 10 times, when the machines were idle (both the local and remote database) and reported the average of the execution times.

The following paragraphs discuss the performance of the Cost Based Optimizer 112. First, the TPCD schema is briefly described. Following this, the queries that were used to evaluate performance are described. Finally, the performance of the three techniques that were used to prune the equivalence classes is described.

TPCD Benchmark Schema

The schema for the TPCD benchmark consists of a PART(20000) table and SUPPLIER(1000) table for suppliers who supply parts. The information of the SUPPLIER-PART relationship is maintained in the PARTSUPP (80000) table. Information regarding customers is in a CUSTOMER (15000) table. Status information for orders placed by customers is maintained in the ORDER table. The key in the ORDER(150000) table is used to identify the parts and the suppliers from whom the part is ordered. This information is in a LINEITEM table, that also maintains shipping information, price, quantity ordered and discount. The ORDER table also maintains the total price of the order, the order and ship priorities. Small NATION(25) and REGION (5) tables were used to associate suppliers and customers with the area they come from. For further information on the TPCD benchmark refer to the TPCD benchmark specification [TPC93]. The overall database size was around 100 MB. The TPCD tables were split and the SUPPLIER, NATION, and REGION table were placed on a remote database that was running on an AIX RS6000 machine that was accessed over the network. The rest of the tables were placed in the local DataJoiner database. DataJoiner accesses the remote tables through a user defined alias, eg: for SUPPLIER the alias is REMDB_SUPPLIER as though these were local tables.

Queries to Evaluate Performance

Three queries, query 2, query 11, and query 15, were chosen from the TPCD benchmark suite. These three queries were chosen because, casual observation of the three queries suggest that these three queries have redundant computation, and employing transient views may be beneficial for their execution. The performance of the rest of the TPCD benchmark queries (query 1 through query 17) were also evaluated to identify transient views. The Cost Based Optimizer 112 did not detect any redundancy in computation and the plans of these queries remained unchanged. The execution times of these queries also did not change, indicating that the Cost Based Optimizer 112 detected transient views that did not affect normal query processing.

The queries are briefly described below. The detailed syntax of the queries are in TABLE 8.

TPCD Q02: Find in a given region, for each part of a certain type and size, the supplier who can supply it at minimum cost. If several suppliers in that region offer the desired part type and size at the same (minimum) cost, the query lists the parts from the suppliers with the 100 highest account balances. For each supplier, the query lists the supplier's account balance, name, nation, the parts number and manufacturer, the supplier's address, phone number and comment information.

TPCD Q11: This query finds by scanning the available stock of suppliers in a given nation, all the parts that represent a significant percentage of the total value of all available parts. The query displays the part number and the value of those parts in descending order of value.

TPCD Q15: Finds all the suppliers who contributed the most to the overall revenue for parts shipped during a given quarter of a year.

Query NQ1: Find the parts, whose size is 45 that represents a significant percentage of the value of the parts that are of size 48.

Query NQ2: Print the names of those parts that were given a 10% discount and also taxed 10% that have been returned and also not accepted.

Optimized Plan vs Transient Views

Figure 9:
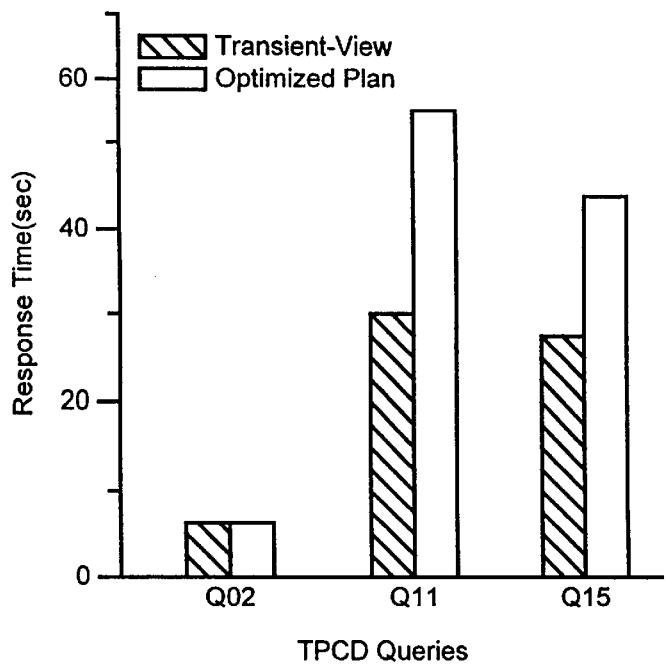
FIG. 9 illustrates the improved performance of a TPCD query plan when transient views are used.

First, the performance of transient views on the three TPCD queries is evaluated and compared with the cases in which the Cost Based Optimizer 112 is not used. FIG. 9 shows a graph of the performance comparisons for these two cases. The results show that transient views reduce the execution time for queries Q11 and Q15 in half. The execution time for Q02 does not change since the transient-view detection mechanism does not detect any redundancy in the plan, although the description of the query indicates that there is redundancy in the plan. This will be better understood in the next section where the transient-view performance is compared with that of identifying common sub-expression based on query syntax.

Figure 10:
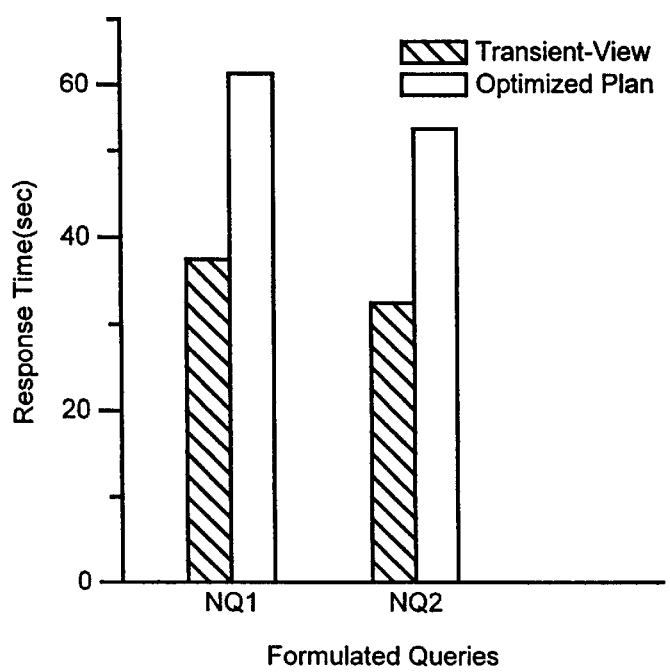
FIG. 10 illustrates the improved performance of a user formulated query plan when transient views are used.

FIG. 10 shows a graph of the performance of two queries that were formulated to further illustrate the performance benefits of using transient-views. Similar to the TPCD queries, the performance graph show the tremendous improvement in performance when transient views are used. For example, the transient views significantly reduce the execution time for queries NQ1 and NQ2.

Transient View vs Query Rewrite

In this section, the detrimental effect of using a query rewrite mechanism to identify common sub-expressions in a query by examining the query syntax as in [Ha174]. The performance of TPCD-Q02 when transient views were used to optimize the query was compared to optimizing the query through a query rewrite mechanism that identifies common sub-expressions.

Figure 11:
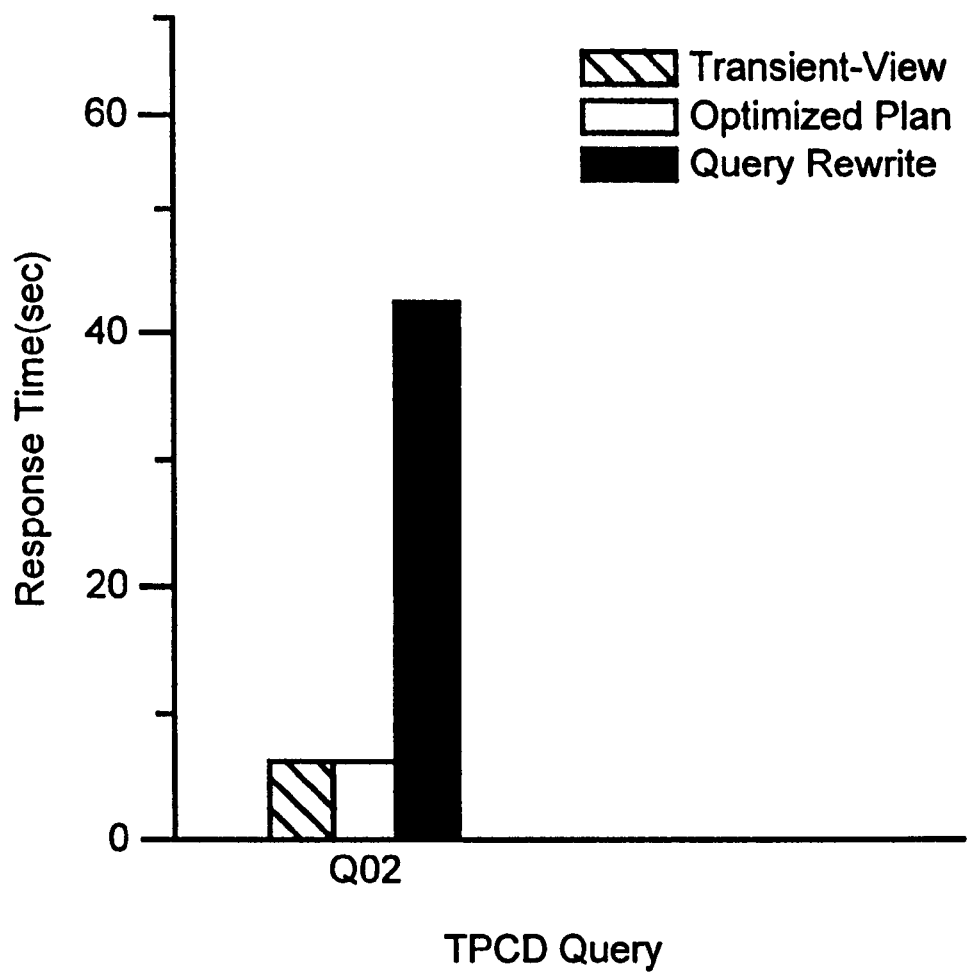
FIG. 11 is a graph that compares the performance of query plans when transient views used to the performance of query plans when query rewrite is used.

TABLE 8 shows the syntax of the query. When examining the plan of the query, it was observed that the sub-plan that can be factored is very small, since it is optimal to join the PART table with PARTSUPP. The cost of executing the query is shown in FIG. 11 is at approximately 40 seconds for the Q02 query. The transient view technique identifies the sub-plan factor that is a join between the REGION and NATION tables. Since the cost of executing the sub-plan is very small, materializing the transient view does not improve performance and the execution cost remained at 4 seconds.

The query rewrite optimization identifies the join between PARTSUPP, REGION, SUPPLIER, and NATION as a common sub-expression. This reduces the join enumeration choices for the optimizer. The optimizer cannot join the PART table with the PARTSUPP table and make use of the index on PARTSUPP table. The performance of query execution is significantly worse. The execution time is around 10 times worse when the common sub-expression is used.

This demonstrates that identifying common sub-expression from the query syntax can degrade performance significantly, while using the technique of factoring sub-plans from the plan helps in improving performance when possible.

SUMMARY OF RESULTS

In summary, the code has no impact on performance for queries that do not benefit from transient views. The overhead of the technique to detect transient views is negligible. Detecting and utilizing transient views help improve performance tremendously demonstrated by the reduction in half of the execution time of the two TPCD benchmark queries. The reason for this reduction is due to using transient view to avoid re-computing the results of a large sub-plan. If the sub-plan results are used multiple times within the same query, the performance benefits would be greater. Comparison of employing transient view technique with that of identifying common sub-expressions based on the query syntax shows that a query rewrite mechanism limits the optimizers choices in choosing plans and could lead to plans that severely degrade performance. This demonstrates that generating transient-views from an optimal plan results in improved performance, and it does not affect queries that do not benefit from transient views.

CONCLUSION

This concludes the description of the preferred embodiment of the invention. The following describes some alternative embodiments for accomplishing the Cost Based Optimizer 112. For example, any type of computer, such as a mainframe, minicomputer, or personal computer, or computer configuration, such as a timesharing mainframe, local area network, or standalone personal computer, could be used with embodiments of the Cost Based Optimizer 112.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

TPCD Queries

TPCD-Q02: Find in a given region, for each part of a certain type and size, the supplier who can supply it at minimum cost. If several suppliers in that region offer the desired part type and size at the same (minimum) cost, the query lists the parts from the suppliers with the 100 highest account balances. For each supplier, the query lists the supplier's account balance, name, nation, the parts number and manufacturer, the supplier's address, phone number and comment information.

```
SELECT S_ACCTBAL, S_NAME, N_NAME, P_PARTKEY,
   P_MFGR, S_ADDRESS, S_PHONE, S_COMMENT
   FROM PART P, REMDB_SUPPLIER S, PARTSUPP PS,
      REMDB_NATION, REMDB_REGION
   WHERE P_PARTKEY = PS_PARTKEY
      AND P_SIZE = 15
      AND P_TYPE LIKE '%BRASS%'
      AND S_SUPPKEY = PS_SUPPKEY
      AND S_NATIONKEY = N_NATIONKEY
      AND N_REGIONKEY = R_REGIONKEY
      AND R_NAME = 'EUROPE'
      AND PS_SUPPLYCOST = (SELECT MIN(PS_SUPPLYCOST)
         FROM PARTSUPP PS1, REMDB_SUPPLIER S1,
            REMDB_NATION N1,
REMDB_REGION
R1                   WHERE P.P_PARTKEY = PS1.PS_PARTKEY
                     AND S1.S_SUPPKEY PS1.PS_SUPPKEY
                     AND S1.S_NATIONKEY =
N1.N_NATIONKEY       AND N1.N_REGIONKEY =
R1.R_REGIONKEY       AND R1.R_NAME = 'EUROPE')
   ORDER BY S_ACCTBAL DESC, N_NAME, S_NAME,
P_PARTKEY;
```

TPCD_Q11: This query finds by scanning the available stock of suppliers in a given nation, all the parts that represent a significant percentage of the total value of all available parts. The query displays the part number and the value of those parts in descending order of value.

```
SELECT
   PS_PARTKEY,
   SUM(PS_SUPPLYCOST*PS_AVAILQTY)
FROM PARTSUPP, REMDB_SUPPLIER, REMDB_NATION
WHERE PS_SUPPKEY = S_SUPPKEY
   AND S_NATIONKEY = S_SUPPKEY
   AND N_NAME = 'GERMANY'
GROUP BY PS_PARTKEY
HAVING SUM(PS_SUPPLYCOST*PS_AVAILQTY)>
      (SELECT SUM(PS_SUPPLYCOST*PS_AVAILQTY)*0.001
         FROM PARTSUPP, REMDB_SUPPLIER,
REMDB_NATION WHERE PS_SUPPKEY = S_SUPPKEY
         AND S_NATIONKEY = N_NATIONKEY
         AND N_NAME = 'GERMANY')
ORDER BY 2 DESC;
• TPCD_Q15: Finds all the suppliers who contributed the most
to the overall revenue for parts shipped during a given quarter of a year.
SELECT S_SUPPKEY, S_NAME, S_ADDRESS, S_PHONE,
TOTAL_REVENUE
FROM REMDB_SUPPLIER, (SELECT L_SUPPKEY AS
SUPPLIER_NO,
      SUM(L_EXTENDEDPRICE * (1-L_DISCOUNT)) AS
TOTAL_REVENUE
   FROM LINEITEM
   WHERE L_SHIPDATE>=DATE('1996-01-01')
      AND L_SHIPDATE <DATE('1996-01-01') + 3 MONTHS
   GROUP BY L_SUPPKEY)R
WHERE S_SUPPKEY = R.SUPPLIER_NO
AND R.TOTAL_REVENUE =
(SELECT MAX(R1.TOTAL_REVENUE)
   FROM (SELECT L_SUPPKEY AS SUPPLIER_NO,
      SUM(L_EXTENDEDPRICE *
      (1-L_DISCOUNT)) AS TOTAL_REVENUE
      FROM LINEITEM
      WHERE L_SHIPDATE>=DATE('1996-01-01')
         AND L_SHIPDATE<DATE('1996-01-01') + 3 MONTHS
      GROUP BY L_SUPPKEY) R1);
• TPCD_NQ1: Find the parts, whose size is 45 that
represents a significant percentage of the value of the parts that
are of size 48
SELECT SUM(PS_SUPPLYCOST*PS_AVAILQTY),
PS_PARTKEY, P_NAME
FROM PARTSUPP, REMDB_SUPPLIER, PART, LINEITEM
WHERE PS_SUPPKEY = S_SUPPKEY
   AND P_PARTKEY = PS_PARTKEY
   AND L_PARTKEY = P_PARTKEY
   AND P_SIZE = 45
GROUP BY PS_PARTKEY, P_NAME
HAVING SUM(PS_SUPPLYCOST*PS_AVAILQTY)>
      (SELECT SUM(PS_SUPPLYCOST*PS_AVAILQTY) * 0.0001
         FROM PARTSUPP, REMDB_SUPPLIER, PART, LINEITEM
         WHERE PS_SUPPKEY = S_SUPPKEY
            AND P_PARTKEY = PS_PARTKEY
            AND L_PARTKEY = P_PARTKEY
            AND P_SIZE = 48)
ORDER BY 2 DESC;
```

TPCD_NQ2: Print the names of those parts that were given a 10% discount and also taxed 10% that have been returned and also not accepted.

```
CREATE NOTACCEPTED (PARTKEY, RETURN) AS
(SELECT L_PARTKEY, L_RETURNFLAG
FROM      LINEITEM
WHERE     L_RETURNFLAG='N'
AND       L_TAX=0.01
AND       L_DISCOUNT=0.01);
CREATE VIEW RETURNED (PARTKEY, RETURN) AS
(SELECT L_PARTKEY, L_RETURNFLAG
FROM      LINEITEM
WHERE     L_RETURNFLAG='R'
AND       L_TAX=0.01
AND       L_DISCOUNT=0.01);
SELECT    REJECT.PARTKEY, PART.P_NAME
FROM      RETURNED, REFUSED, PART
WHERE     NOTACCEPTED.PARTKEY=RETURNED.PARTKEY
AND       PART.PARTKEY=RETURNED.PARTKEY;
```

What is claimed is:

1. A method of modifying a query plan for improved performance, comprising:

(a) identifying a plurality of sub-plans within the query plan;

(b) generating one or more equivalence classes for the query plan, wherein each equivalence class contaims similar ones of the sub-plans;

(c) generating a transient view to answer all of the sub-plans in an associated one of the equivalence classes, wherein the transient view contains a union of results from all of the sub-plans in the associated one of the equivalence classes;

(d) utilizing a cost model to identify the transient views that improve the performance of the query plan; and (e) applying filters to the identified transient views to obtain results for each sub-plan in the associated equivalence class.

2. The method of claim 1, further comprising determining whether to materialize the transient view.

3. The method of claim 1, wherein slimlar ones of the sub-plans contained in an equivalence class are identified by one or more properties.

4. The method of claim 3, wherein the properties are selected from a property list comprised of one or more of the following: tables in the plan, columns selected, join predicates, selection predicates, aggregation functions, columns in a GROUP BY list, data sources, a cost of executing the plan, and a number of result rows.

5. The method of claim 4, further comprising:
generating a query that represents the transient view from the property list of the transient view;
optimizing the query; and
obtaining an execution plan, cost, and cardinality for the transient view.

6. The method of claim 1, further comprising using the cost model to decide whether to materialize the transient view.

7. The method of claim 1, wherein the sub-plans each have a scan type property, a table scanned property, a simple predicates property, and a columns selected property, further comprising the step of using one or more of these properties to determine which of the sub-plans are similar.

8. The method of claim 1, wherein the sub-plans each have a join method property, a join predicates property, an outer plan property, and an inner plan property, and further comprising the step of using one or more of these properties to determine which of the sub-plans are similar.

9. The method of claim 1, wherein the sub-plans each have an input plan property, and further comprising the step of using this property to determine which of the sub-plans are similar.

10. An apparatus for optimizing one or more queries, comprising:
(a) a computer having a data storage device connected thereto, wherein the data storage device stores a database;
(b) one or more computer programs performed by the computer, for:
(1) identifying a plurality of sub-plans within the query plan;
(2) generating one or more equivalence classes for the query plan, wherein each equivalence class contains similar ones of the sub-plans;
(3) generating a transient view to answer all of the sub-plans in an associated one of the equivalence classes, wherein the transient view contains a union of results from all of the sub-plans in the associated one of the equivalence classes;
(4) utilizing a cost model to identify the transient views that improve the performance of the query plan; and
(5) applying filters to the identified transient views to obtain results for each sub-plan in the associated equivalence class.

11. The apparatus of claim 10, wherein the computer programs further comprise one or more computer programs for determning whether to materialize the transient view.

12. The apparatus of claim 10, wherein similar ones of the sub-plans contained in an equivalence class are identified by one or more properties.

13. The apparatus of claim 12, wherein the properties are selected from a property list comprised of one or more of the following: tables in the plan, columns selected, join predicates, selection predicates, aggregation functions, columns in a GROUP BY list, data sources, a cost of executing the plan, and a number of result rows.

14. The apparatus of claim 13, wherein the computer programs further comprise one or more computer programs for:
generating a query that represents the transient view from the property list of the transient view;
optimizing the query; and
obtaining an execution plan, cost, and cardinality for the transient view.

15. The apparatus of claim 10, wherein the computer programs further comprise one or more computer programs for using the cost model to decide whether to materialize the transient view.

16. The apparatus of claim 10, wherein the sub-plans each have a scan type property, a table scanned property, a simple predicates property, and a columns selected property, wherein the computer programs further comprise one or more computer programs for using one or more of these properties to determine which of the sub-plans are similar.

17. The apparatus of claitn 10, wherein the sub-plans each have a join method property, a join predicates property, an outer plan property, and an inner plan property, and wherein the computer programs further comprise one or more computer programs for using one or more of these properties to determine which of the sub-plans are similar.

18. The apparatus of claim 10, wherein the sub-plans each have an input plan property, and wherein the computer programs further comprise one or more computer programs for using this property to determine which of the sub-plans are similar.

19. An article of manufacture comprising a computer program carrier readable by a computer and embodying one or more instructions executable by the computer to perform method steps of optimizimg one or more queries, the method comprising the steps of:
(a) identifying a plurality of sub-plans within the query; plan;
(b) generating one or more equivalence classes for the query plan, wherein each equivalence class contains similar ones of the sub-plans;
(c) generating a transient view to answer all of the sub-plans in an associated one of the equivalence classes, wherein the transient view contains a union of results from all of the sub-plans in the associated one of the equivalence classes;
(d) utilizing a cost model to identify the transient views that improve the performance of the query plan; and
(e) applying filters to the identified transient views to obtain results for each sub-plan in the associated equivalence class.

20. The article of manufacture of claim 19, further comprising determining whether to materialize the transient view.

21. The article of manufacture of claim 19, wherein similar ones of the sub-plans contained in an equivalence class are identified by one or more properties.

22. The article of manufacture of claim 21, wherein the properties are selected from a property list comprised of one or more of the following: tables in the plan, columns selected, join predicates, selection predicates, aggregation functions, columns in a GROUP BY list, data sources, a cost of executing the plan, and a number of result rows.

23. The article of manufacture of claim 22, further comprising:
generating a queryn that represents the transient view from the property list of the transient view;
optimzing the query; and obtaining an execution plan, cost, and cardinality for the transient view.

24. The article of manufacture of claim 19, further comprising using the cost model to decide whether to materialize the transient view.

25. The article of manufacture of claim 19, wherein the sub-plans each have a scan type property, a table scanned property, a simple predicates property, and a columns selected property, further comprising the step of using one or more of these properties to determine which of the sub-plans are similar.

26. The article of manufacture of claim 19, wherein the sub-plans each have a join method property, a join predicates property, an outer plan property, and an inner plan property, and further comprising the step of using one or more of these properties to determine which of the sub-plans are similar.

27. The article of manufacture of claim 19, wherein the sub-plans each have an input plan property, and further comprising the step of using this property to determine which of the sub-plans are similar.

* * * * *

UNITED STATES PATENT AND TRADEMARK OFFICE
CERTIFICATE OF CORRECTION

PATENT NO.    : 6,275,818 B1
DATED         : August 14, 2001
INVENTOR(S)   : Narayana Lyer Subramanian and Shivakumar Venkataraman It is certified that error appears in the above-identified patent and that said Letters Patent is hereby corrected as shown below:

<u>Title page,</u>
Item [56], References Cited, please insert the following, --             OTHER DOCUMENTS
Levy, A. et al., "Answering Queries Using Views" (Extended Abstract), AT&T Bell Laboratories, pages 95-104 (date unknown).

Srivastava, D. et al., "Answering Queries with Aggregation Using Views", Proceedings of the $22^{nd}$ VLDB Conference, Mumbai (Bombay), India, 12 pages (1996).

Gupta, H., "Selection of Views to Materialize in a Data Warehouse", Department of Computer Science, Stanford University, 15 pages (date unknown).

Sellis, T., "Multiple-Query Optimization", ACM Transactions on Database Systems, 13(1):23-52 (March 1988).

Ross, K. et al., Materialized View Maintenance and Integrity Constraint Checking: Trading Space for Time", AT&T Foundation, pages 447-458 (date unknown).

Dar, S., et al., "Semantic Data Caching and Replacement", Proceedings of the $22^{nd}$ VLDB Conference, Mumbai (Bombay), India, 12 pages (1996).

Sellis, T. et al. "On the Multiple-Query Optimization Problem", IEEE Transactions on Knowledge and Data Engineering, 2(2):262-266 (June 1990).

UNITED STATES PATENT AND TRADEMARK OFFICE
CERTIFICATE OF CORRECTION

PATENT NO. : 6,275,818 B1
DATED : August 14, 2001
INVENTOR(S) : Narayana Lyer Subramanian and Shivakumar Venkataraman It is certified that error appears in the above-identified patent and that said Letters Patent is hereby corrected as shown below:

Hall, P.A. V., "Optimization of Single Expressions in a Relational Data Base System", IBM J. Res. Develop., pages 244-257 (May 1976). --

Signed and Sealed this

Eighteenth Day of February, 2003

JAMES E. ROGAN
*Director of the United States Patent and Trademark Office*